United States Patent
Sheffield et al.

(10) Patent No.: US 8,930,242 B2
(45) Date of Patent: Jan. 6, 2015

(54) AUCTION SYSTEM

(75) Inventors: Chris Sheffield, Congleton (GB); Mike Sale, Huddersfield (GB); Scott Davies, Manchester (GB)

(73) Assignee: IGT, Las Vegas, NV (US)

( * ) Notice: Subject to any disclaimer, the term of this patent is extended or adjusted under 35 U.S.C. 154(b) by 1967 days.

(21) Appl. No.: 10/561,897

(22) PCT Filed: Jun. 28, 2004

(86) PCT No.: PCT/GB2004/002760
§ 371 (c)(1),
(2), (4) Date: Feb. 12, 2007

(87) PCT Pub. No.: WO2005/001728
PCT Pub. Date: Jan. 6, 2005

(65) Prior Publication Data
US 2007/0174171 A1    Jul. 26, 2007

(30) Foreign Application Priority Data

Jun. 26, 2003   (GB) .................................... 0314940.8

(51) Int. Cl.
*G06Q 30/00*    (2012.01)
*G06Q 40/04*    (2012.01)
*G06Q 30/08*    (2012.01)

(52) U.S. Cl.
CPC ............... *G06Q 30/08* (2013.01); *G06Q 40/04* (2013.01)
USPC ...................................................... 705/26.3

(58) Field of Classification Search
USPC .................. 705/37, 26, 14.71, 26.3
See application file for complete search history.

(56) References Cited

U.S. PATENT DOCUMENTS

| 7,415,425 | B1 | 8/2008 | Walker et al. | |
| 7,801,802 | B2 | 9/2010 | Walker et al. | |
| 2002/0032641 | A1* | 3/2002 | Mendiola et al. | 705/37 |
| 2003/0078873 | A1 | 4/2003 | Cohen | |
| 2004/0006538 | A1* | 1/2004 | Steinberg et al. | 705/39 |
| 2004/0059663 | A1* | 3/2004 | Herzog et al. | 705/37 |
| 2004/0059790 | A1* | 3/2004 | Austin-Lane et al. | 709/207 |
| 2004/0098332 | A1* | 5/2004 | Dvir | 705/37 |
| 2004/0267624 | A1* | 12/2004 | Nuriel | 705/26 |
| 2006/0074792 | A1 | 4/2006 | Walker et al. | |

(Continued)

FOREIGN PATENT DOCUMENTS

| EP | 1220126 A2 * | 7/2002 |
| WO | WO-01/35292 A1 | 5/2001 |
| WO | WO-01/52135 A1 | 7/2001 |

OTHER PUBLICATIONS

"Hong Kong's Tender", Jun. 2000, pp. 1-2.*

(Continued)

*Primary Examiner* — Ryan D Donlon
(74) *Attorney, Agent, or Firm* — Neal, Gerber & Eisenberg LLP

(57) ABSTRACT

A method for auctioning a lot, in which a plurality of messages are received from a plurality of bidders for the lot, with each message including a bid for the lot. A bid acceptance message is sent by SMS to each of the bidders notifying the bidder of the status of the bidder's bid. Each bidder is charged for sending the bid acceptance message. The bidder associated with the lowest unique bid for the lot is determined.

30 Claims, 14 Drawing Sheets

(56) References Cited

U.S. PATENT DOCUMENTS

2006/0218077 A1    9/2006   Walker et al.
2006/0224497 A1   10/2006   Walker et al.
2006/0242055 A1   10/2006   Walker et al.
2006/0242056 A1   10/2006   Walker et al.
2006/0287924 A1*  12/2006   Admon .......................... 705/26

OTHER PUBLICATIONS

"Link77: Link77 introduces reverse charge SMS billing service for ringtones and logos", M2 Presswire. Dec. 18, 2001.*

"Bidshot.com takes online auctions to cellphones", Oct. 23, 2000, The Philippine Star.*

Unrealmind.com "Our Products", Apr. 8, 2004, Archvied at http://web.archive.org/web/20040408211712/http://www.unrealmind.com/our_products_mobile_services.htm.*

"QXL SmartBid Heml" Jun. 23, 2004, Archived at: http://web.archive.org/web/20040623203312/http://www.qxlsmartbid.com/qxluk/php/Help.php.*

NMA Staff, "Ebay to offer life SMS Bids" Sep. 9, 2001, Available at: https://econsultancy.com/nma-archive/24296-ebay-to-offer-live-sms-bids.*

* cited by examiner

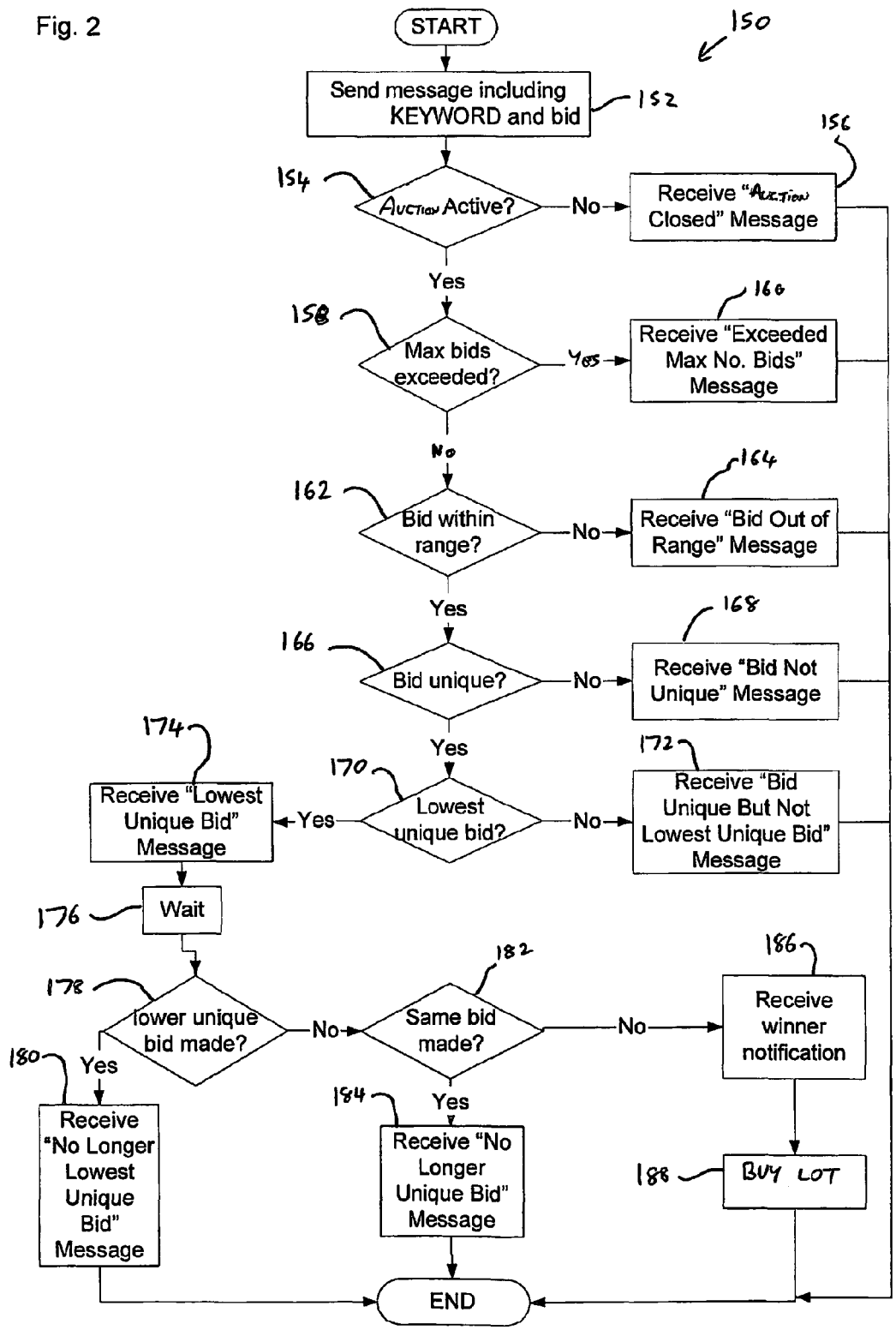

| MessageStore | |
|---|---|
| PK | MessageID |
| | MessageBody |
| | TimeReceived |
| | Status |
| | TimeSent |
| | UserID |
| | UserGameID |
| | AggretatorRefID |
| | BatchID |
| | MobileNo |
| | NetworkOperator |
| | AggregatorShortCode |
| | ReceiptID |
| | ReceiptTimestamp |
| | ReceiptStatusID |

AUCTION SYSTEM

The present invention relates to an auction system and in particular, to an auction system, and associated computing apparatus, methods, computer program code, computer program products and data structures, in which a lowest unique bid wins an auction.

A traditional, English or ascending auction involves people making bids for a lot, and in which the highest final bid is successful. The highest bidder pays the bid price for the lot and the auction house takes a proportion of the bid amount. Hence, revenue is generated for the auction house and for the person that put the lot up for auction. Typically a reserve price for a lot may be used, being the lowest acceptable price for the lot. In this auction format, only the highest bidder makes any payment for being involved in the auction process.

There are other forms of auctions, such as Dutch auctions, in which several like lots are sold at once to the highest bidders. However, again, this only generates revenue from the few successful bidders rather than from all of the bidders. Also, there are reverse auctions which are a buyer-initiated auction in which a buyer invites bids from multiple sellers. The price decreases as sellers compete for the buyer's business and the lowest bid is considered the winner. There can be variations in the auctions such as the buyer not being bound to accept the lowest bid, but may accept any bid, or not being bound to accept any bids. In this model, the only revenue stream is from the buyer to the successful seller.

Further, other than price competition, none of these models have further drivers to engage the participants in the auction process and to encourage multiple bids.

Therefore it would be advantageous to provide a mechanism for encouraging greater bidder participation and generating revenue for an auction host from each bid rather than only a winning bid.

The present invention therefore provides an auction system which uses charged messaging to notify bidders of the current status of an auction that they are participating in.

According to a first aspect of the invention, there is provided a method for auctioning a lot, comprising receiving messages from bidders for the lot, each message including a bid for the lot, sending a bid acceptance messages to each of said bidders notifying the bidder of the status of their bid, charging each bidder for sending the bid acceptance message and determining a bidder associated with the lowest unique bid for the lot.

By quickly letting a bidder know the status of their accepted bid, the bidder is more engaged in the auction process and so may be encouraged to make another bid, and as the bidder is charged for each bid acceptance message, the revenues generated by the auction are increased, as each accepted bid generates revenue rather than only the ultimately successful bids.

In a preferred embodiment, the bid acceptance messages are sent by SMS or other later generation mobile phone messaging service, or any other suitable messaging service, to a communication device of the bidder.

The messages received from bidders can be sent using a number of methods based partly or wholly on the internet, including e-mail or via http as input or a response to a web. The messages can be received via SMS messaging or other later generation mobile phone messaging service.

Charging each bidder can include levying or making a charge for receiving the bid acceptance message to an account of the bidder for the service provider of the communications network via which the acceptance message was sent. Charging each bidder can include sending the bid acceptance message by a reverse billed SMS message.

The method can further comprise limiting each bidder up to a maximum number of bids per auction.

The bid acceptance message can notify the bidder that their bid has been accepted. The bid acceptance message can notify the bidder that their bid is the current lowest unique bid, their bid is not unique or their bid is unique, but is not currently the lowest unique bid. By letting the bidder know the status of their accepted bid, the bidder can be encouraged to make further bids in the auction, irrespective of any other bids changing the status of their accepted bid.

The method can further include sending a notification message to a bidder when the status of the bidder's bid changes. In this way, bidders can be encouraged to make further bids, if the status of their accepted bids change as a result of bids made by other bidders. The status of the bidder's bid can change to not currently being a unique bid. The notification message can notify the bidder that their bid is no longer unique and/or the price of the bidder's bid. The status of the bidder's bid can change to not currently being the lowest unique bid. The notification message can notify the bidder that their bid is no longer the lowest unique bid but is currently a unique bid.

The received bidder messages can be passed at least partially over the internet before processing the bid and/or the bid acceptance messages can be passed at least partially over the internet before being sent over a cellular telecommunications network and/or telephone network. Preferably, the received bidder messages and/or the bid acceptance messages are sent at least partially by SMS.

Preferably, the communication with the bidders is handled by software in real time. By providing a rapid response to the bidder's bids, the bidder is more engaged with the auction process and auctions can be carried out over a short time scale. Preferably, the bid acceptance messages are sent within less than 30, 20, 10 or 5 minutes of a bidder message being sent.

According to a further aspect of the invention, there is provided a computer implemented method for facilitating bidder participation in an auction, comprising: receiving a bid data item over a computer network, the bid data item being derived from a bid message sent by a bidder; determining whether the bid data item is the current lowest unique bid for an auction; if it is determined that the bid data item is the current lowest unique bid, then generating a bid acceptance message indicating that the bid is the current lowest unique bid, and if it is determined that the bid data item is not the current lowest unique bid, then generating a bid acceptance message indicating that the bid is not the current lowest unique bid; determining a destination telecommunications device phone number for the acceptance message; and sending the acceptance message, at least partially over the computer network, for transmission to the bidder at the destination telecommunications device by a reverse billed SMS message.

The method can further comprise receiving an auction identifier data item with the bid data item, the auction identifier data item being derived from the same bid message sent by a bidder as the bid data item. The auction identifier data item can be in the form of a keyword. The auction identifier data item can be used to determine an auction, or a one of a plurality of streams of the same auction, corresponding to the auction identifier data item.

The method can further comprise validating the bid data item to determine whether the bid is an acceptable bid for the auction. Validation can include, checking that the bid amount is in the correct currency units, checking that the bid amount is in an acceptable range of bids and checking whether the bidder associated with the bid has already made a maximum number of permissible bids for the lot or auction.

The method can further comprise polling a message store to identify new messages. New message data can be loaded into a message objection for passing to an auction engine or application for further processing of bid data and/or other data in the message object. A mobile phone telephone number data item can be used to determine whether the bid is associated with a live session for an auction and if it is then loading message data into a message object. If the bid is not associated with a live session for the auction, then an auction identifier data item can be used to determine whether the bid is for an auction and if it is then loading message data into a message object. The message object can be passed to an auction engine or application.

The method can further comprise checking whether the bid data item is in the correct bid units, and if not, then converting the bid data item into the correct bid units. The bid units can be currency units and preferably are the subunit, or fractional currency unit, for a currency, e.g. cents or pence.

The can further comprise generating a unique identifier for each bid data item received. The unique identifier can be used for audit purposes and to provide an identifier of a bid to a bidder as a part of a bid status notification message.

Validating the bid data item can includes at least one operation selected from: determining whether an auction is active; determining whether the bid exceeds a maximum number of bids for the bidder; and determining whether the bid data item falls within a range of acceptable bid values.

Determining whether the bid data item is the current lowest unique bid for the auction further comprises carrying out a look up of, or running a database query on, a database of stored bid data items for the auction. The look-up or query can include determining whether the number of stored bids at the bid data item value is zero. If the number of stored bids at the bid data item value is zero then a look up or query of the database of stored bid data items for the auction can be carried out to determine the current lowest unique bid value. The method can include determining whether the bid data item value is less than the current lowest unique bid value.

Generating messages can include populating a message template with stored data items. Generating the bid acceptance message can include selecting a message template for the acceptance message, looking up stored variable data items and populating the message template with the variable data items.

Sending messages can include loading a message object with message data. The auction application or engine can load the message object and pass the message object to a service.

Sending the bid acceptance message can include loading a message object with message data and bidder data. Sending the bid acceptance message or bid status notification message can further include placing the message object in a message queue table.

Sending the bid acceptance message or bid status notification message can further include polling the message queue table to identify new messages. New messages can be passed to an aggregator service for transmission as an SMS message to the bidder.

The method can further include receiving a receipt ID from the aggregator for the message passed to the aggregator. The method can include storing the receipt ID when received.

The method can further comprise determining whether the receipt ID has been received and updating a status associated with the sent message.

The method can further comprise receiving a message receipt status data item from an aggregator service and storing the message receipt status data item so as to allow the receipt status of the message to be determined.

The method can further comprise identifying a group of lowest unique bids and determining the lowest bid for the group of lowest unique bids for which the bid acceptance message has been received. Hence, this mechanism ensures that only bids that have been paid for can be identified as the winning bid for the lot.

According to a further aspect of the invention, there is provided a computer system for facilitating bidder participation in an auction, comprising: at least a first data processing device and a memory in communication with the data processing device, the memory storing instructions for configuring the processor to: receive a bid data item over a computer network to which the computer system is connected, the bid data item being derived from a bid message sent by a bidder; determine whether the bid data item is the current lowest unique bid for an auction; if it is determined that the bid data item is the current lowest unique bid, then to generate a bid acceptance message indicating that the bid is the current lowest unique bid, and if it is determined that the bid data item is not the current lowest unique bid, then to generate a bid acceptance message indicating that the bid is not the current lowest unique bid; determine a destination telecommunications device phone number for the acceptance message; and send the acceptance message, at least partially over the computer network, for transmission to the bidder at the destination telecommunications device by a reverse billed SMS message.

The computer system can be adapted to include counterpart features to the preferred features of the preceding method aspects of the invention.

According to a further aspect of the invention, there is provided computer program code executable by a data processing device to provide the method aspects of the invention and the computer system aspect of the invention. There is also provided a computer program product comprising a computer readable medium storing computer program code according to that aspect of the invention.

An embodiment of the invention will now be described in detail, by way of example only, and with reference to the accompanying drawings, in which:

FIG. 2 shows a flow chart illustrating a method of interaction of a user with the system of the invention;

Figure 1A:
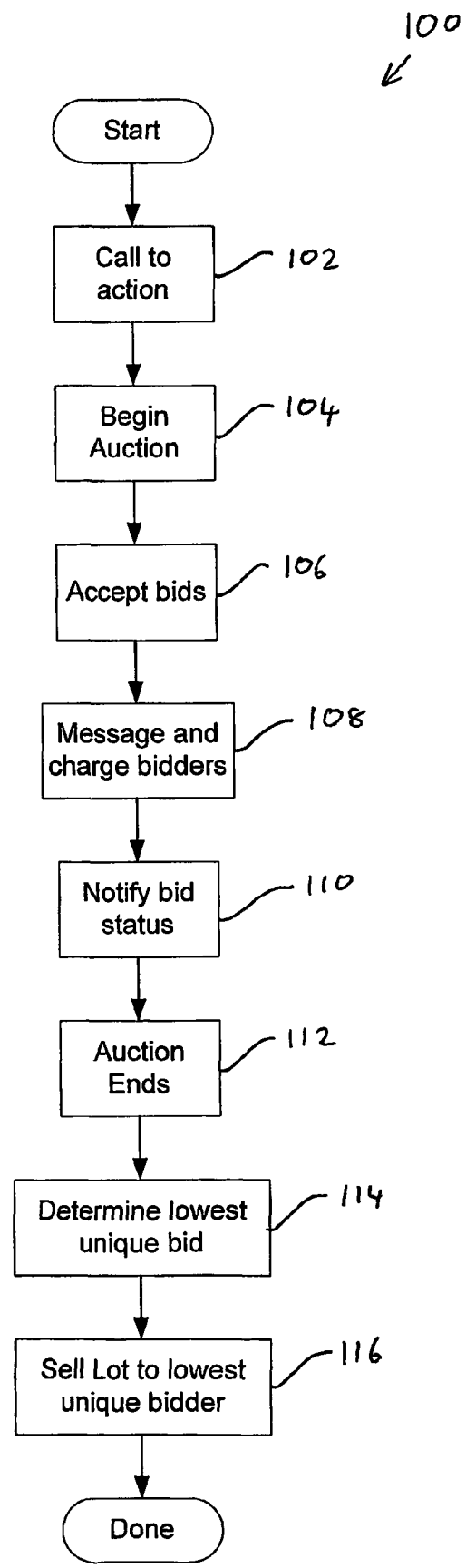
FIG. 1A shows a flowchart illustrating an overview of the auction method of the invention at a high level.

Like items in different figures share common reference numerals unless indicated otherwise.

Before describing an embodiment in detail, an overview of the invention will be given with reference to FIG. 1A which shows a flowchart illustrating an auction method 100 at a high level. The invention involves a reverse of a traditional auction. The auction has been developed to be promoted "on air" by, e.g., TV and radio stations in the UK, or whatever country or region the auction is operating in, and on this basis has been developed to include a number of features.

In some countries, promotions and prize competitions, e.g. within the UK, are subject to a number of laws and regulations. The auction of the present invention has been developed to ensure that the auction can be promoted via any channel and is not subject to the majority of restrictive laws and regulations. A feature of the auction is that whilst the auction features the characteristics of a prize competition or a lottery it has been legally structured and classified as an "auction".

A technical engine has been developed for the operation of the auction using a combination of internet and mobile phone (SMS) technologies (the mechanic). The mechanism for the reverse auction includes bids and communication with bidders being handled by the software in real time.

The lowest unique number or bid is an auction where the bidder bids for a Lot by selecting a number (within a defined range/different range depending on "Lot") which the bidder thinks will be the lowest unique number or bid. This number represents the bidders bid in Pounds sterling, or other local currency unit, or the currency subunit, e.g. pence. During the auction bidders are kept notified by text message about their bid, whether it is unique, whether it stops being unique etc. and allows the bidder to make another bid if he so wishes up to a maximum number of bids per auction, e.g. five bids.

At the completion of the auction the winner is the person with the lowest unique bid who must then purchase the lot at the agreed price as agreed within the terms and conditions.

The general game mechanics are as follows. The lot is described on air, print or via the web 102 and participants are invited to bid for the product with the understanding that the person with the lowest unique bid within a set period of time is the winner (e.g. 24 hours). The auction begins 104 and bids are accepted 106 via reverse billed SMS (text) messages 108 and each bid has a related charge directly billed to the bidders mobile phone account (e.g. £1 to £5 per bid).

Following the call to action 102, a bidder selects a bid value e.g. 77. The bidder texts their bid 106 to a mobile phone short code using SMS. Upon receipt of a bid via SMS, the reverse auction software logs the bid, the bidder's phone number and one of the following responses, for example, is issued automatically to the bidder 108 via SMS:

Congratulations, you are currently the lowest unique bidder at £XXXX for the Lot Sorry £XXXX is not a unique bid, with XXXX other bids at this price. If you would like to bid again reply Y Well done you have a unique bid but £XXXX is not currently the lowest unique bid. If you would like to bid again reply Y Where £XXXX indicates the amount of the bid and XXXX is the number of other bids at the bid price.

If a bid, which was a unique bid no longer becomes unique due to another bidder selecting this bid the system will send a text message 110 notifying the first bidder:

Bad luck there has been another bid at the same price and £XXXX is no longer unique. If you would like to bid again reply Y If a bid which was the lowest unique bid no longer becomes the lowest unique bid the system will send a text message notifying 110 the bidder You no longer hold the lowest unique bid although your bid remains unique. If you would like to bid again reply Y When the auction closes, the bidder with the lowest unique bid is identified 114 and are determined to be the winner of the auction and the Lot is sold 116 to that bidder at the lowest unique bid price 116.

When the auction closes 112, in the event where all realistic bids have been taken (i.e. every number in the defined range has been bid) and there is no unique bid then the successful bidder is determined 114 by selecting the lowest unique bid with the fewest bidders and of those bidders, the first person to have made that bid will win the Lot and must purchase at the agreed price 116.

A number of restrictions may be applied to the auction. For example, a maximum number of bids per bidder per auction may be five. No responsibility may be taken by the organiser of the auction for any bids not received due to telecommunications technical failures, etc. A bidder accepting terms and bidding constitutes a transaction: i.e. by bidding on an item the bidder agrees to be bound by the conditions. As a buyer, the buyer must ensure that they are legally able to bid for and buy any item that they bid for.

Figure 1B:
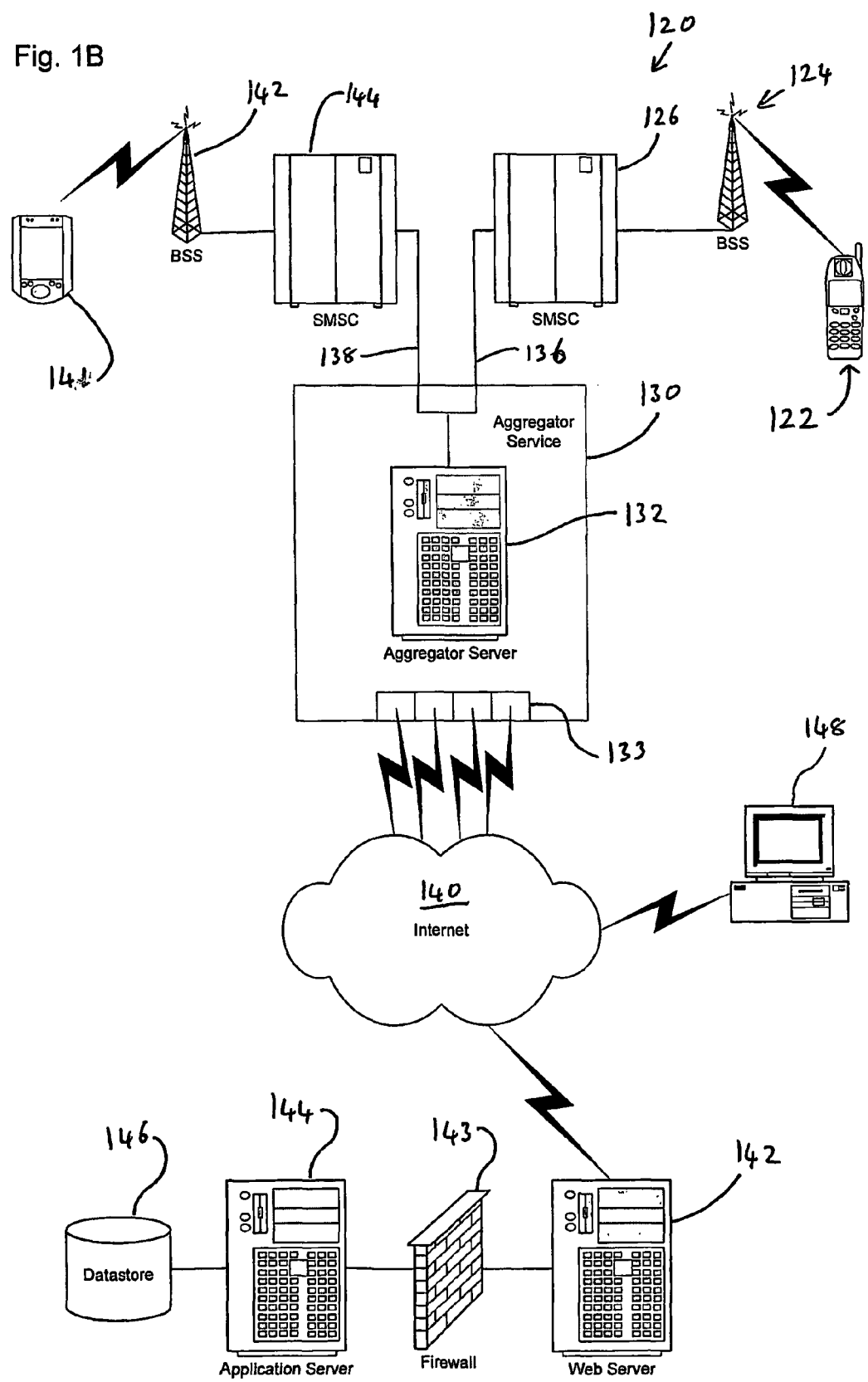
FIG. 1B shows a schematic block diagram of a system of the invention.

With reference to FIG. 1B, there is shown a schematic diagram of a telecommunications system 120 in which the apparatus and methods of the present invention can be incorporated. The telecommunications system includes a first wireless cellular communications device, such as a cellular telephone 122, which can transmit and receive messages using a short message service (SMS), also colloquially referred to as "texting". The SMS message is passed to a base station 124 which in turn passes the message to a short message service centre (SMSC) 126 for the particular network or service provider to which the user of the device 122 is a subscriber. The first short message service centre 126 is in communication with an aggregator service 130. A user of a second wireless communications device 141, such as a smart phone or combined PDA and phone, which operates on a different telecommunications network to the first device 122 similarly can send messages using SMS via a base station 142 of that network and to a short message service centre 144 for that network operator. Similarly, short service message centre 144 is in communication with the aggregator service 130. As will be appreciated by those of ordinary skill in the art, the description of the cellular telecommunication network hardware has been greatly simplified in order not to obscure the nature of the present invention. Other conventional hardware elements can be present as will be apparent to those of ordinary skill in the art.

The aggregator service 130 provides a gateway providing access to and from different telecommunications networks. The aggregator service includes an aggregator server computer 132 by which SMS message can be sent and received over the communications networks. The aggregator server communicates with the communications networks over communications paths 136 and 138 using a suitable data communication protocol, e.g. over TCP/IP, and the communications networks use data transmitted from the aggregator to generate and send the SMS message, or extract data from SMS messages and send the data to the aggregator server. The communications paths 136 and 138 are shown as dedicated lines but can be any communication path by which data can be sent between the aggregator service and the network hardware, such as wireless, fibre optic, or via a communications network, such as the internet.

The aggregator server 132 has a number of ports 133 by which an application server can communicate with the aggregator server as will be described below. A separate port is provided per telephone number, be it a short code telephone number or conventional telephone number, and per network operator. Hence if there were only one short code number and four different networks, at least four separate ports would be provided, as illustrated in FIG. 1B. If there were two short code numbers and three different networks, then at least six ports would be provided. Separate ports are not essential and are just one example of a way in which the aggregator can provide access to SMS messages sent to a particular telephone number over a particular communications network.

A web server 142 is provided with communications software enabling it to connect to and communicate with the ports of the aggregator server via the internet 140. An application server 144 is provided in communication with the web server 142 via a firewall 143, which provides security and some message filtering. A data store 146 holding a number of databases is also provided in communication with the application server. The application server hosts a number of applications, including an auction application, a service application, and an administration or back office application for administering back office functions. The application server 144 can connect to the different ports 133 of the aggregator server 132 using TCP/IP over the internet to transmit and receive data. TCP/IP is only an example of how the data can be transmitted between the aggregator and application servers and other suitable data communication protocols can be used.

Information to be sent as, or received in, an SMS message can be passed between the servers. A number of servers can be used and the particular architecture shown in FIG. 1 is merely an example. For example, in another embodiment, a different physical server can be provided for each of the applications described above as running on the application server 144. Also, the application server need not be in a different domain to the aggregator server and, for example, could sit within the aggregator service 130.

The application server is also accessible via the internet 140 by an administration client computer (not shown) for carrying out certain administrative tasks. The web server 142 hosts a website by which data can be published to the internet. The back office/administration application is in communication with the web server and also a back office database part of the data store 146. The back office application allows various administration processes to be carried out and which can be used to manage the website hosted on the web server 142 and also to manage and carry out various administrative tasks relating to the auction application running on the application server 144. The administration client can also communicate with the application server 144 over the internet so as to administer auction data stored in the data store 146 as will be described in greater detail below.

Although a cellular telephone has been shown in FIG. 1B, it will be appreciated that any wireless communications device capable of sending and receiving SMS messages can be used in the telecommunications system 120 shown in FIG. 1B. For example, a smart phone or a personal digital assistance (PDA) 141, incorporating wireless communications functionality could be used. It will also be appreciated that the present invention is not limited only to SMS messaging, and future similar or equivalent services, but can also be taken advantage of in other wireless telecommunications environments.

For example, in an alternate embodiment messaging can be carried out by sending e-mail bids over the internet 140 or by accessing a web page and entering a bid via a form or other user interface on a web page. For example device 122 can be an internet enabled cellular telephone which can send and receive e-mails over the internet or access a web page. Similarly, communications device 141 can be an electronic personal digital assistant including web browser software which can also send and receive e-mails over the internet either via a built in modem and phone or via a separate phone, or enter bid data into a form on a web page. Either PDA 141 and/or cellular telephone 122 can be java-based devices. Further, a bidder having a mobile phone, can use a web browser application running on a computer 148 to access a web page hosted by web server 142 via the internet in order to make a bid.

The following description of a specific embodiment of the invention will predominantly refer to telecommunications system 100 within the context of SMS messaging. It will be apparent to a person with ordinary skill in the art how to adapt the general principle as taught into the domain of e-mail or web based information or message transfer, e.g. by http, or other communications protocols.

With reference to FIG. 2 there is shown a flowchart illustrating a method 150 by which a user can interact with an auction, or game, according to the present invention. At step 152, the user sends a message including at least a key word and the bid amount to the auction system. In one embodiment, the user can send the message by entering the key word and bid amount into an online form via computer 148 which is then transmitted to the auction system via the Internet 140. In another embodiment, the user sends the message including the key word and bid amount by SMS messaging from their mobile phone.

It is then determined whether the game is active, that is whether the auction has begun or ceased. If it is determined at step 154, by the auction system, that the auction is not active, then the auction system sends a message indicating that the auction is not open to the user's mobile phone by SMS messaging 156 and the user's interaction ends. If it is determined that the auction is active then at step 158 it is determined whether that particular bidder has exceeded the maximum number of allowed bids, e.g. five, for the particular auction. If it is determined that the bidder has exceeded the maximum number of allowed bids then at step 160 the user is sent a message indicating the same to their mobile phone via SMS messaging 160 and the user's interaction with the system ends.

At step 162, if the auction system determines that the bidder's bid does not fall within an allowable range then a message indicating the same is sent via SMS messaging to the user's mobile phone 164 and again the user's interaction ends. If it is determined that the user's bid is within the range, then at step 166 the auction system determines whether the bid amount is unique, i.e. whether there are any other bids at the same amount for this auction. If the auction system determines that the bid is not unique then the user's bid is still accepted and a bid acceptance message indicating that the user's bid has been accepted but is not unique is sent to the user's mobile phone via reverse billed SMS messaging and a related charge is directly billed to the bidder's mobile phone account. The message can also provide the bidder with the opportunity to place a further bid by sending a reply including a new bid amount. If the user does not reply to this message then the user's interaction ends. At any later time, the user can start a new session with the auction system by sending the key word and a new bid amount, effectively returning to step 152.

If at step 166 the auction system has determined that the bid is unique then at step 170 the auction system determines whether the bid is the current lowest unique bid and if not, then the user is sent a bid acceptance message indicating that while their bid is unique, it is not the lowest unique bid. The acceptance message is sent via reverse billed SMS message and the accepted bid has a related charge which is directly billed to the bidder's mobile phone account. Again the bid acceptance message provides the option to reply with a further bid amount and if the user does not reply, then the user's interaction ends. While the user's bid may be unique, e.g. the bidder may be the only person to have bid 77p for the lot of the auction, it is possible that another bidder has bid a lower unique amount, e.g. 64p, for the lot of the auction.

If at step 170, the auction system determines that the bid is the current lowest unique bid then a bid acceptance message is sent via reverse billed SMS messaging to the bidder 174 indicating the same. This bidder's interaction with the system is paused or otherwise suspended for a period 176 until another bid is made by a bidder which changes the status of the bidder's bid, or the auction closes.

After a bid has been made by another bidder then the auction system determines 178 whether that other bid is a lower unique bid. If the other bid is a lower unique bid then the holder of the previously lower unique bid is sent a message via SMS to their mobile phone indicating that they are no longer the holder of the lowest unique bid and that user's interaction ends. If it is determined that although a lower unique bid has not been made, a further bid at the same price as the previously lowest unique bid has been made 182 then an SMS message is sent to the holder of the previously lowest unique bid indicating that their bid is no longer unique and the user's interaction ends. If at the close of the auction neither a lower unique bid nor a bid at the same amount has been made, then the holder of the current lowest unique bid is notified by an SMS message, or by an e-mail message, that they have won the auction and at step 188, the winning bidder buys the lot at the price of their lowest unique bid and the user interaction ends.

Figures 3, 4:
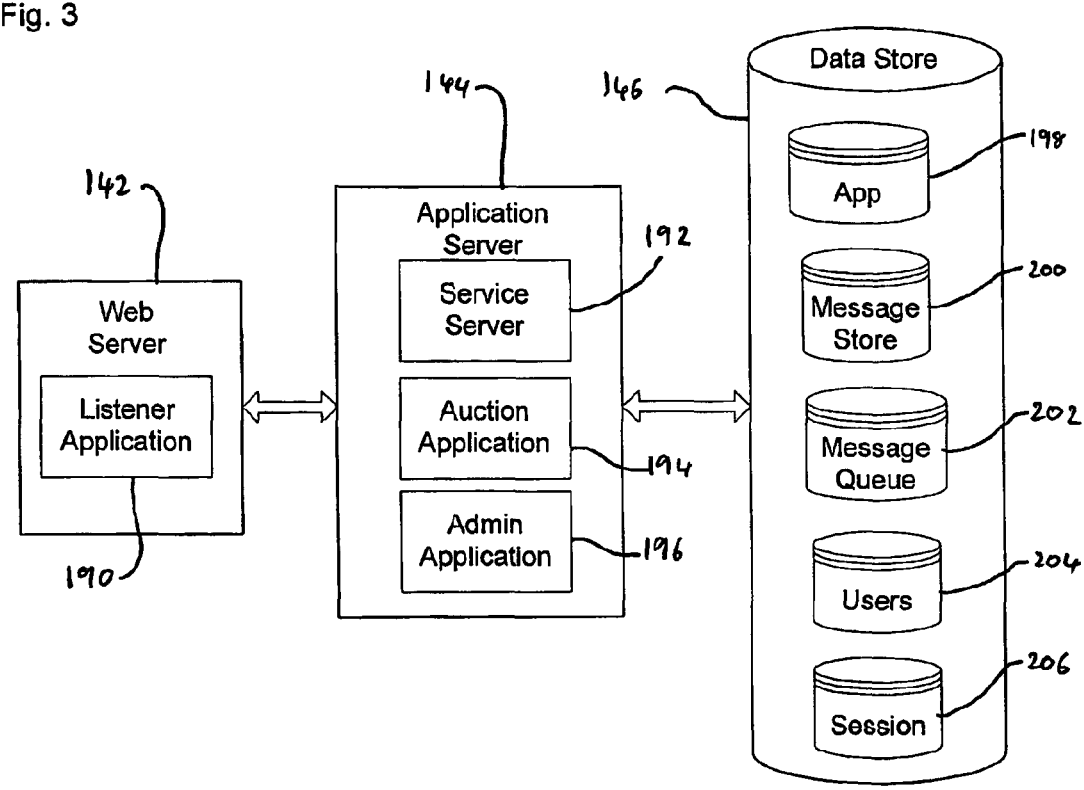
FIG. 3 shows a schematic block diagram illustrating parts of the system shown in FIG. 1.
FIG. 4 shows a table for a message store database.

With reference to FIG. 3, there is shown a schematic software architecture of the web server 142, application server 144 and data store 146. The web server includes a listener service or listener application. When the aggregator server 132 receives an SMS message, the mobile number from which the SMS message was sent, the message body and a time stamp are sent via http over the Internet and the listener's application on the web server 142 listens for and receives the message data sent by the aggregator 132 and stores the message information in the data store 146 as will be described in greater detail below.

The application server 144 includes a service server 192 which checks for newly received messages and determines to which application to pass the message data. An auction application 194 is also provided on the application server and implements the auction process. An administration application 196 is also provided via which various back office procedures can be carried out, auctions can be set up by an administrator and winners of the auction can be identified and notified by an administrator.

Data store 146 includes a number of databases or database tables storing various data items used by the various applications on the web server and application server. An application database 198 is provided which stores data items used by the auction application. A message store 200 is provided for storing data items relating to the messaging process. A message queue database 202 is provided for storing data items relating to ingoing and outgoing messages. A user's database 204 stores various information relating to users of the service, such as names, addresses, mobile phone numbers and a unique user identifier allocated to each user on registration with the auction system. A session database 206 is also provided which stores data items identifying whether a bidder is currently engaged in a session with the auction system in which case a further bid can be made by merely replying to a message sent by the auction system rather than having to send a key word in order to identify the auction in which the user wants to place a bid.

FIG. 4 shows a schema 210 for the message store database 200. The message store table 210 has a field for storing a message ID which is the primary key for the message store table. The message ID is a unique identifier for each message received by the listener application from the aggregator. Table 210 has a message body field for storing the message body of the SMS message, received from the aggregator, which will include both the auction key word and the bid amount. A time received field stores a data item indicating the time that the message was received.

A status field stores a data item representing the status of the message. The status of the message can be "R", indicating the message has been received, "S", indicating that the message has been sent, "U", indicating that the system is waiting to determine the status of the message and "F", indicating that the message failed to send. A user ID field stores a unique identifier for the user of the auction system associated with the message which is obtained from the user's database 204. A user game ID field stores a data item indicating the particular auction or game for which the user placed the bid. An aggregator ref ID field stores a unique identifier received back from the aggregator service when an SMS message has been despatched by the aggregator. A batch ID field stores a data item which identifies a batch of messages returned by the aggregator. A mobile number field stores the mobile phone number from which the bid was sent and is obtained from the aggregator server. The mobile phone number provides a destination addressing data item as it identifies the destination address to which messages for the bidder are to be sent. In an e-mail based embodiment, a destination addressing data item could be an e-mail address for a bidder. A network operator field stores a data item identifying the particular network over which the SMS message was sent from the mobile phone and is passed from the aggregator. An aggregator short code field stores a data item indicating the short code to which the SMS message was sent.

A receipt ID field stores a unique identifier for a message received by the aggregator for transmission as an SMS message. A receipt status ID field stores a data item indicating the status of the message corresponding to the receipt ID. The status of the sent SMS message can be delivered, failed, expired or invalid. This data item provides a mechanism by which the auction system can determine whether an SMS message has been received by the bidder and in particular for a reverse billed SMS message which has been delivered, indicates that the appropriate charge has been made to the bidder. A receipt time stamp field stores a data item indicating the time at which the SMS message was received at the bidder's handset and is also passed by the aggregator together with the receipt ID and receipt status ID.

The listener application 190 generally takes in SMS messages and populates the relevant data items into the fields of the message store database and also passes and receives data items to the aggregator server. The listener application polls the aggregator with the receipt ID data item so as to check the receipt status ID which is updated in the message store so as to provide an indication of whether the user has received the bid acceptance message or bid status notification messages generated by the auction system.

Figure 5:
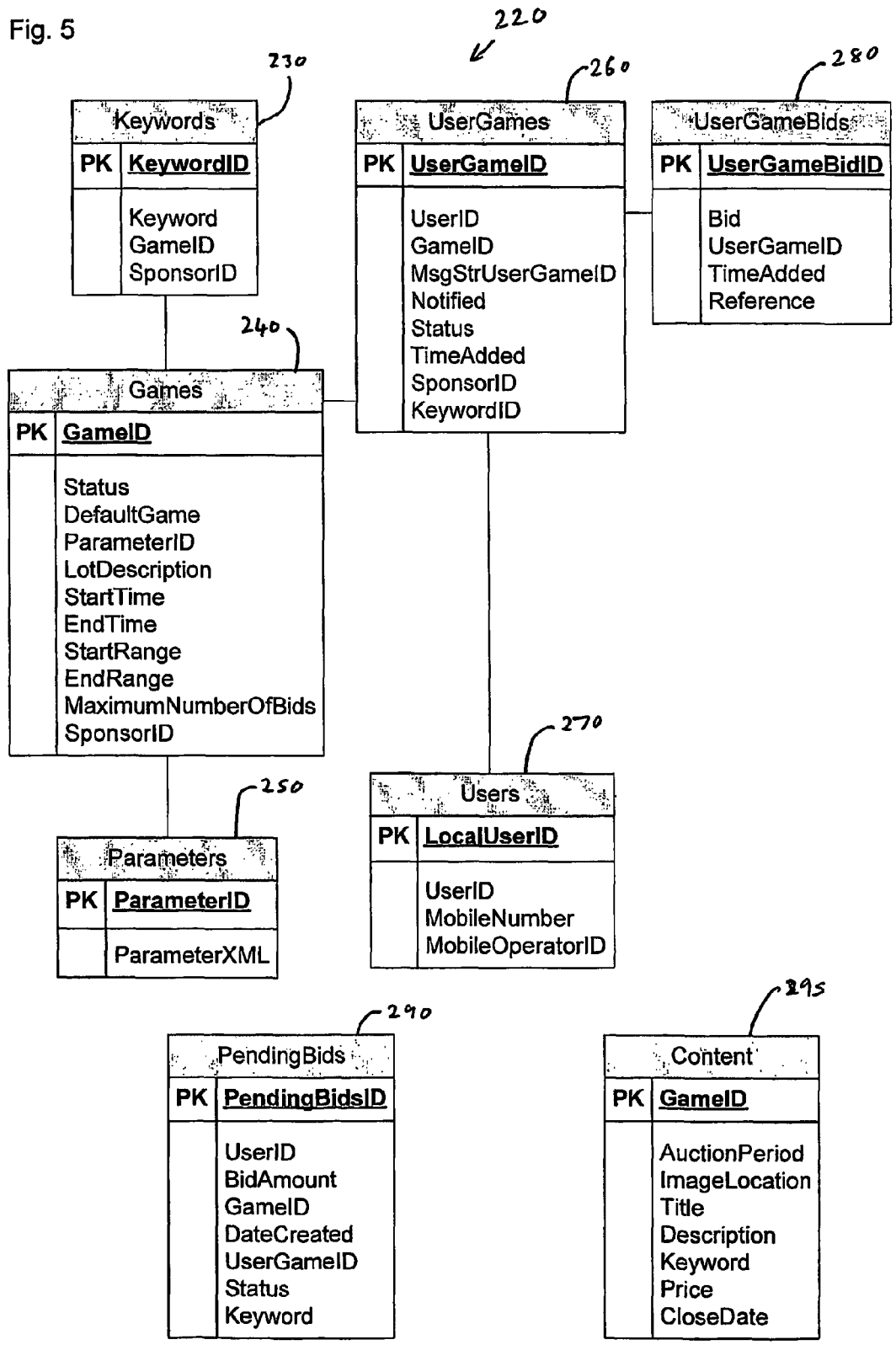
FIG. 5 shows a schema for a database shown in FIG. 3.

FIG. 5 shows a database schema 220 for the application database 198 and including a table of the user's database 204.

A key words table 230 stores a key word ID data item providing a unique identifier for each key word used to identify the different auctions being handled by the auction system and which is the primary key for table 230. Table 230 also has fields for storing the text of a key word, an identifier for the game or auction associated with the key word and a data item identifying any sponsor associated with that particular auction.

A games table 240 stores data items for each of the auctions provided by the auction system. The primary key for the table is a unique game identifier, game ID and the table stores data items indicating the status of the auction, i.e. whether it is active or inactive, whether a default auction scheme should be used if a key word is not recognised, a parameter ID data item, a description of the lot being auctioned, a start time for the auction, an end time for the auction, a lower limit to the bid range and an upper limit to the bid range, a maximum number of bids permissible per bidder and an identifier of any sponsor associated with the auction.

A parameters table 250 stores XML message parameters which are used to generate the bid acceptance and bid status notification messages sent to the bidders. A parameter ID data item is the primary key for the table and a parameter XML field stores six XML message templates having fixed wording into which variable data items specific to each user and bid can be inserted so as to customise the message appropriately. The message templates include messages indicating that a bid is the current lowest unique bid, a bid is a non-unique bid, a bid is unique but not the lowest bid, that a bid is no longer a unique bid, that a bid is no longer the lowest unique bid and a default error message.

A user games table 260 stores information about each of the bidder's entries. This table stores various data items, including a data item identifying the user, a data item identifying the auction and a MsgStrUserGame ID, which is a unique identifier for the users game session, which is used by SMS gateway software to manage the SMS session for the user.

A user's table 270 includes various data items, some of which are obtained from the main user's database 204, which stores information about each of the bidders who have bid. The table stores a global user identifier obtained from the user's table 204 and the associated mobile telephone number and identifier for the mobile phone network operator associated with that mobile phone number. A local user ID is the primary key for the table and provides a unique identifier for the particular user in the context of the current auction application, rather than any other applications being handled by the application server.

A user game bids table 280 stores information about each of the bids and includes fields for storing data items indicating the bid amount, a user game ID, the time the bid was added and a reference associated with the bid. A user game bid ID data item is the primary key for the table and identifies each bid made by each user for each of the auctions.

A pending bids table 290 can also be provided in order to accept bids placed via the online web form rather than sent by SMS messaging, as will be described in greater detail below with reference to FIG. 16. This table stores information about first time bidders who have placed a bid via the online web form. A pending bids ID provides a unique identifier for each pending bid and is the primary key for the table. Fields are provided for storing a user ID data item, a data item indicating the amount of a bid, a data item identifying the game, a data item indicating the date that the table entry was created, the user game ID data item, the status of the bid and the key word entered into the online web form. This data is stored temporarily when a first time bidder has completed the online web form entering, their bid amount, their mobile telephone number, their mobile operator, and their name and address details.

When a bid is submitted by a first time bidder using the online web form, then the bidder's bid details are written into the pending bids table 290 and set with a status of unconfirmed. An SMS message is then generated and sent to the bidder asking them to confirm the amount of their bid by replying to the SMS message with a "Y". Once the bidder has confirmed their bid by replying via SMS, then the data from the pending bids table is written into the other tables in the database thereby both registering the first time bidder and allowing the bidder's bid to be processed. From then onwards, the bidder is sent the same messages as an SMS bidder. A content table 295 is also provided which stores various data items for configuring the web content for each auction.

Figure 6:
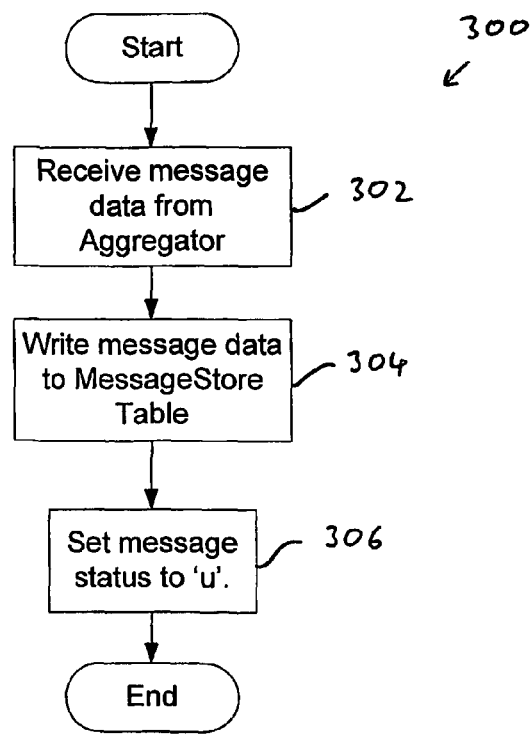
FIG. 6 shows a flow chart illustrating a listener process executing on the web server part of FIG. 3.

With reference to FIG. 6, there is shown a flowchart illustrating the operations carried out by the listener application 190. Previously, a bidder has sent an SMS message to a short code, the SMS message including a key word identifying the auction followed by a space and then the amount of the bidder's bid in pence, although it will be appreciated that in other countries, the local unit of currency will be used instead. The aggregator receives the SMS message via the SMS service centre. The aggregator sends various data items via the Internet to the web server which receives the message data from the aggregator at step 302. The listener service then writes various of the data items to the message store table 210, such as the message body, the time received, the mobile phone number from which the SMS message was sent, the network operator and the short code via which the SMS message was sent. Then at step 306 the status of the message is set to "U" to indicate that the message is awaiting processing by the service server 192.

Figure 7:
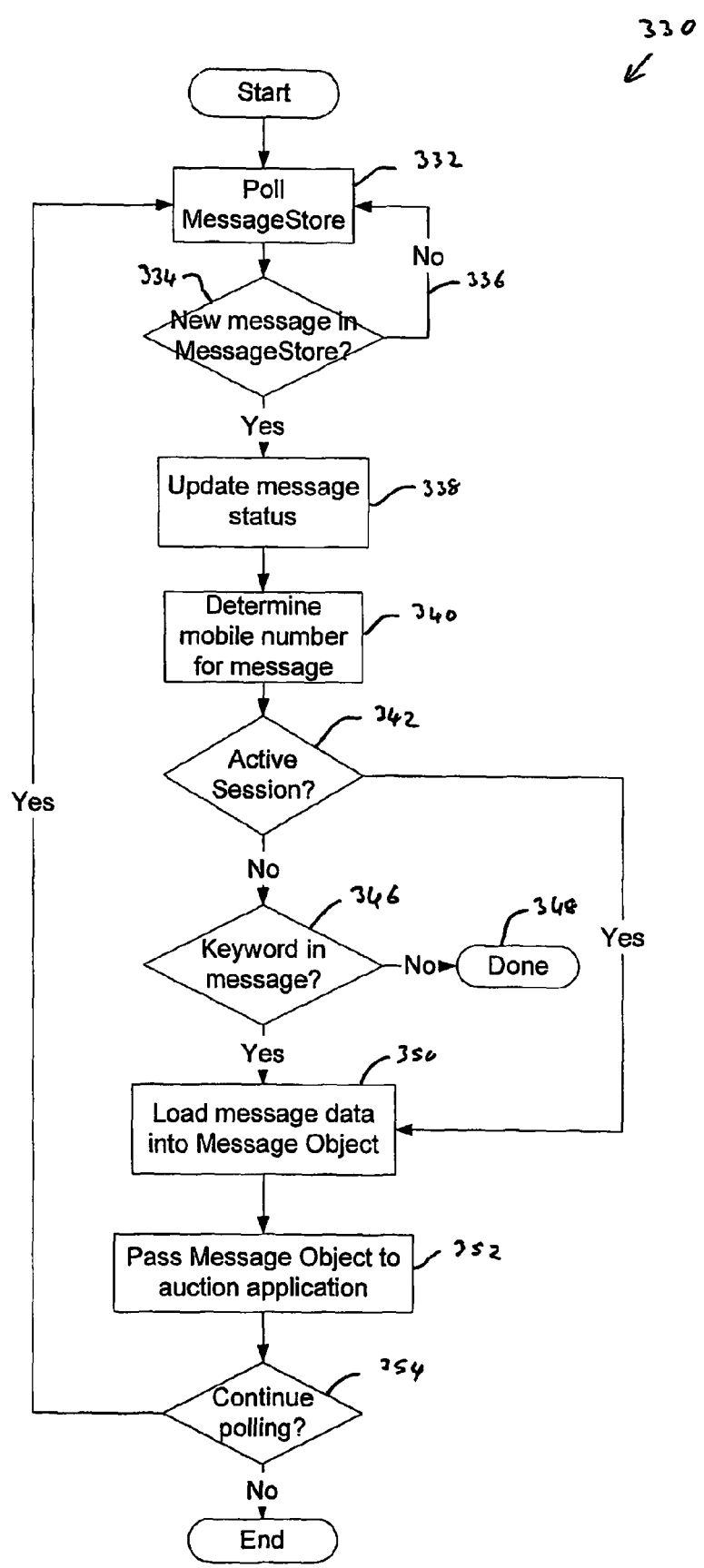
FIG. 7 shows a flow chart illustrating a service process executing on the application server part of FIG. 3.

FIG. 7 shows a flowchart illustrating processes carried out by the service server 192. At step 332, the service server polls the message store 200 to determine at step 334 whether any new messages, with status identified as waiting, have been received in the message store. If not, then process flow returns to step 322 at which the service periodically polls the message store. If a new message has been received, then at step 338, the message status is updated to "R" indicating that the message has been received and the mobile phone number data item is read from the message store table at step 340. Using the mobile phone number data item, a look up in the general users table 204 is carried out to identify the user ID associated with the mobile phone number. At step 342, the user ID is used to query the session database 206 to determine whether there is an ongoing session for that user. This may be the case if the user has already received a message and is merely sending an SMS reply to that message, rather than the message being an initial message making a bid.

If at step 342, it is determined that there is an active session for the identified user, then at step 350, the service server loads the message data into a message object. If at step 342 it is determined that there is no active session associated with the mobile number and user, then at step 346, the service determines whether a key word associated with a one of the auctions is present in the message body. If no key word associated with an auction is identified at step 346, then the message is determined to fail and processing can terminate at step 348. If a key word is identified in the message, then at step 350 the message data is loaded into a message object. Then at step 350, the message object is passed 352 to the auction application 194 for further processing. Then at step 354, it is determined whether the service should continue polling the message store and if so, then process flow returns to step 332. Otherwise, the service server can terminate.

The SMS message object includes the message body, the aggregated service ID data item, the operator identifier, the mobile phone number, the status, the date, the key word and the user ID information. All of these data items are available to the service server either from the aggregator or from a look up of the appropriate data items from the message store table.

Figure 8:
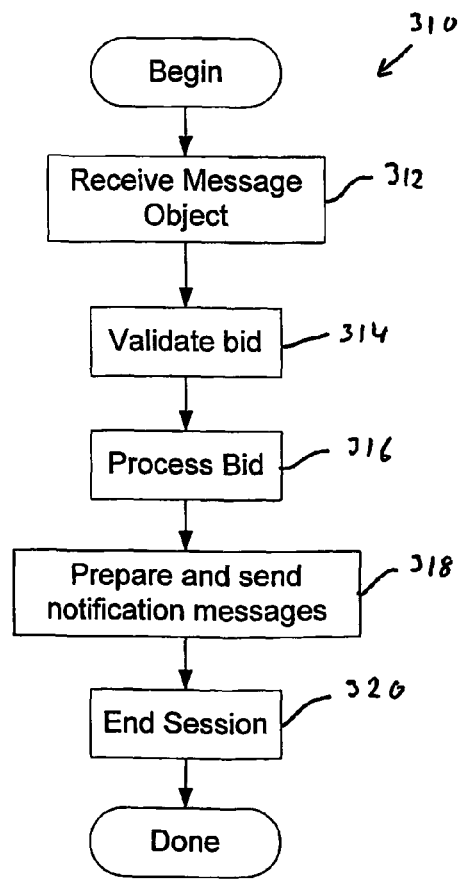
FIG. 8 shows a high level flow chart illustrating an auction process executing on the application server of FIG. 3.

FIG. 8 shows a high level process flowchart 310 illustrating operation of the auction application 194. At step 312, the auction application receives the message object including various data items from the service server as described above. Then at step 314, the auction application carries out a bid validation process 314 in order to determine whether the bid is a valid bid.

Figure 9:
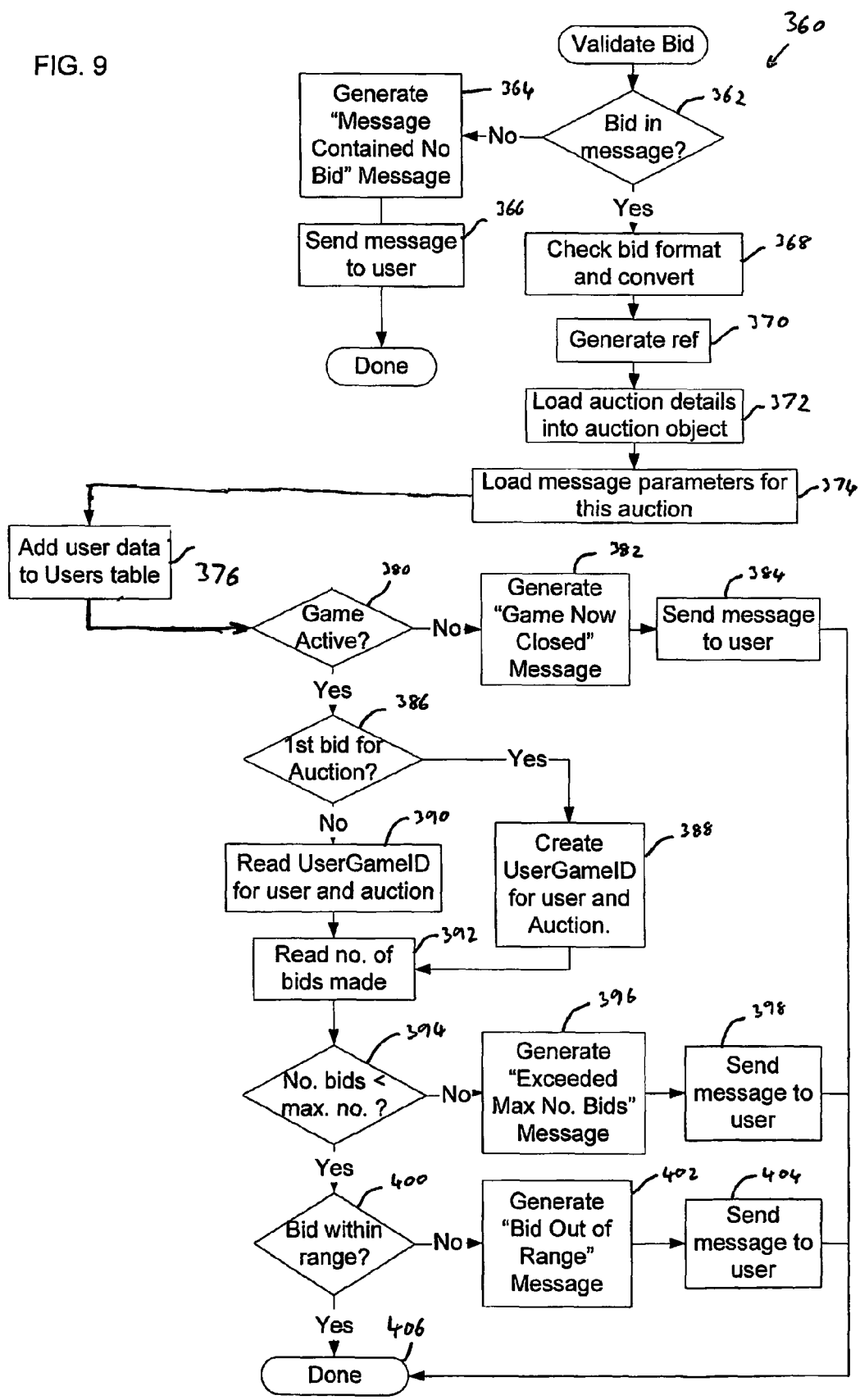
FIG. 9 shows a flow chart illustrating a validate bid process being part of the flow chart of FIG. 8.

FIG. 9 shows a process flowchart 360 illustrating the bid validation process in greater detail. At step 362 the bid validation process 360 determines whether a number corresponding to a bid is present in the message. If not, then at step 364 a message is generated indicating that no bid was contained in the received SMS message and at step 366, the message data is sent to the user via SMS. The processes involved in generating a message and sending a message will be described in greater detail below with reference to FIGS. 11 and 12 respectively.

If a bid is identified in the message, then at step 368 the format of the bid amount is checked to ensure that it is in the correct units and if not, then the bid amount is converted into the appropriate units. For example, in the United Kingdom, if the units of the bid should be in pence (the monetary subunit for the UK), and if a user submits a bid in pounds (the monetary unit for the UK), then the amount in pounds is converted into pence. In other countries, e.g. those in which the dollar is the monetary unit and cent is the monetary subunit, then if the bid is submitted in dollars, it is converted into cents. Then at step 370, a unique bid reference is generated and stored in the user game bids table. Then at step 372, using the key word obtained from the message object, the game ID associated with that key word is determined from the key words table 230 and using the game ID data item, the auction parameters associated with the auction associated with they key word are loaded from table 240 into an auction object at step 372.

Then at step 374, using the parameter ID data item for the auction, the message parameters or message templates are loaded from the parameters table 250 for this auction. In general, six different message templates are available. The first is used to indicate that a bid is a lowest unique bid. The second to indicate that a bid is unique but not the lowest. The third is used to indicate that a bid is not a unique bid. The fourth is used to indicate that a bid is no longer the lowest unique bid. A fifth is used to indicate that a bid is no longer unique and a sixth provides general default error messages as will be described below. The message templates include variable parts which can be populated with stored data specific to each bid while the remainder of the message is a fixed format message wording.

At step 376, an entry is created in the users table 270 using the user ID for the current user so as to improve speed of processing by providing local access to various data items associated with the user ID. At step 380, a look up of games table 240 is carried out to determine whether the status of the auction is active and also to ensure that the current time falls within the start time and end time of the auction. If it is determined at step 380 that the game is not active, then at step 382 a game close message is generated and at step 384 the message is sent to the user via SMS.

If it is determined at step 380 that the game is active then process flow proceeds to step 386 at which it is determined whether this is the first bid from the user for a particular auction.

There can be several parallel 'streams' for any one auction. An auction is defined in terms of the single lot associated with the auction. For example, the lot may be a car. Bidding for that same lot may be promoted through different channels, e.g. different sponsoring companies may want to promote participation in the auction for the same lot. Therefore a bidder can select to bid for that same lot but using one of several different streams to the same auction. For example five companies may all be promoting bids in the same lot and a bidder can decide with which of the streams of the auction they wish to participate. This provides a mechanism by which the promoters of the different streams can each profit from the auction activity even though there is only a single lot and in effect a single overall auction. For example five different key words can each be associated with the same actual auction and a different sponsor can be associated with each of the five key words.

Hence, when a bidder makes a bid by texting a particular key word and their bid amount for the lot, it is possible to associate the revenue generated by that bid with both the auction host and also one of several the sponsoring company. However, the same physical bidder may make a bid for the same lot using a different one of the key words and the system needs to be able to cope with the same individual making bids from the same mobile telephone but using the different key words.

At step 386, it is determined, by carrying out a look up in the user games table 260 to read the user ID, game ID and key word ID data items, whether a user game ID is associated with the user. If a user game ID is not associated with the user and the particular stream of the auction, then at step 388 a user game ID is created for the user and an entry in the user games table 260 is created. If at step 386 it is determined that a user game ID already exists for the user, game ID and key word ID, then at step 390 the user game ID is read for the user and the particular stream of the auction.

Then at step 392, the number of entries in the user game bids table for that bidder are counted so as to determine the number of bids that have already been made by that user for this stream of the auction. Then at step 394, it is determined whether the number of bids already made exceeds the maximum number of bids allowed for this stream of the auction as identified by the relevant data item from table 240. If it is determined that the maximum number of bids has been exceeded, than at step 396, a message indicating the same is generated and at step 398 sent to the user.

If it is determined at step 394 that the maximum number of bids has not been exceeded, then process flow proceeds to step 400 at which it is determined whether the bid is within the acceptable bid range. A look up of the start range and end range data items from games table 240 is carried out in order to determine that the bid amount is within the acceptable range. If it is determined that the bid is outside of the range then a message indicating the same is generated at step 402 and sent to the user at step 404. If the bid is within the acceptable range then the validation process completes at step 406 and method 310 continues.

Figure 10:
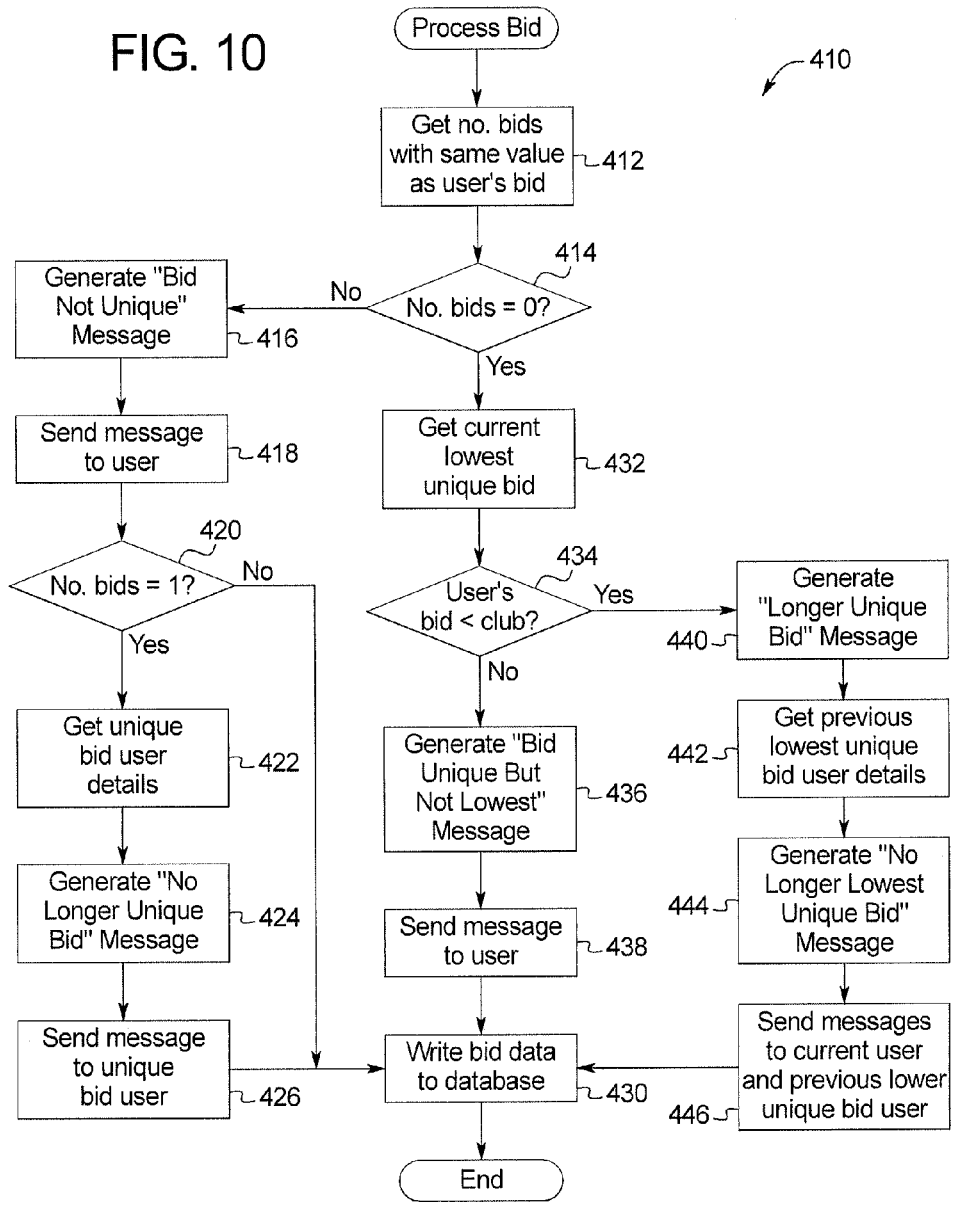
FIG. 10 shows a flow chart illustrating a process bid process being part of the flow chart of FIG. 8.

Returning to FIG. 8, following validation of a bid, at step 316 the bid is processed to determine the status of the bid. FIG. 10 shows a process flowchart 410 illustrating the data processing operations associated with the bid processing step 316.

At step 412 the auction application carries out a look up of the user game bids tables to identify the total number of bids having the same value as the bid currently being processed. At step 414, it is determined whether the number of previous bids having the same value of the currently processed bid is equal to zero. If it is determined at step 414 that the number of previous bids with the same value as the currently processed bid is not zero, then at step 416 a message indicating that the current bid is not unique is generated and at step 418, the message is sent to the current user.

Then at step 420 it is checked whether the number of previous bids having the same value as the current bid is one. If the previous number of bids is one, the it will be necessary to notify the holder of the previously unique bid that their bid is no longer unique. Therefore process flow proceeds to step 422 in which the details of the user with a previously unique bid are looked up. Then at step 424, a message indicating that their bid is no longer a unique bid is generated and at step 426 that message is sent to the user via SMS. Then at step 430 the current bid data is written to the database. At step 420, if it is determined that the previous number of bids and the same value of the current bid is not one, then this means that this bid amount was not previously unique and therefore there is no need to notify a bid holder that their bid is no longer unique. Therefore process flow proceeds directly to step 430 at which the current bid data is written to the database.

If it is determined at step 414 that the number of previous bids having the same value as the current bid is zero, then process flow proceeds to step 432 at which a database query is carried out to determine the current lowest unique bid. Then at step 434 it is determined whether the current bid is less than the current lowest unique bid and if not, then process flow proceeds to step 436 at which a message indicating that the current bid is unique but not the lowest is generated and then sent to the user at step 438. The current bid data is then written to the database at step 430.

Figure 11:
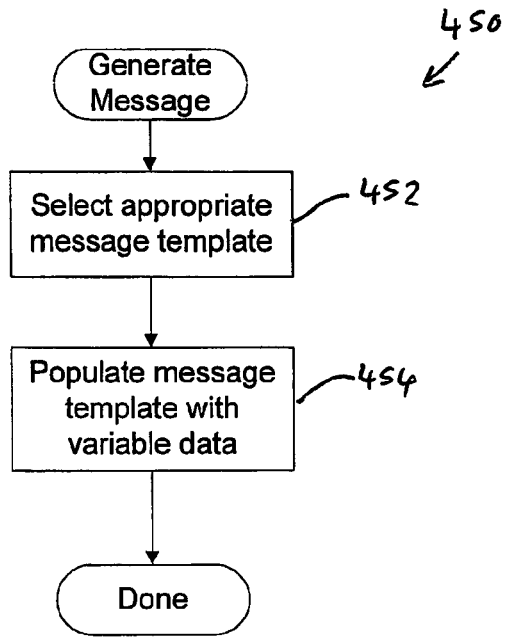
FIG. 11 shows a flow chart illustrating a message generation process used by the processes of FIGS. 9 and 10.

If at step 434 it is determined that the current bid is less than the current lowest unique bid then process flow proceeds to step 440 at which a message indicating that the current bid is the current lowest unique bid is generated. FIG. 11 shows a flowchart illustrating the process of generating a message, corresponding to steps 416, 424, 436, 440 and 444.

The message generation process 450 begins by selecting the appropriate message template from the parameters table using the parameter ID data item from the games table using the game ID corresponding to the appropriate user game ID for the bid. For example for step 440, the message template may be of the form:

Congratulations, you are currently the lowest unique bidder at %1p for the %3.
Your ref: %4. Bid again? Reply e.g. %5 where %1 corresponds to the bid data item, %3 to the lot description data item, %4 to the bid reference data item and %5 to the key word data item. Hence, at step 454, the message template is populated with the appropriate data items from the database so as to generate the message to be sent e.g.

Congratulations, you are currently the lowest unique bidder at 22p for the 32" television. Your reference MF4DJ9. Bid again? Reply e.g. TVBID 72

Process flow then returns to step 442 at which a database look up is carried out to obtain the user details for the previous lowest unique bid and the mobile number, operator, user ID are returned from the users table 270. A message status of queued is associated with the message to be generated and an aggregator service ID is obtained corresponding to the mobile phone number. Then at step 444 a message notifying the previous holder of the lowest unique bid is generated to notify that bidder of the change in status of their bid.

As explained above with reference to FIG. 11, the appropriate message template is selected, e.g.

Back luck your bid of %1p for the %3 is now no longer the lowest unique bid. To bid again reply with your new bid e.g. %5

Then the message template is populated with the variable data obtained using the user ID for the previous holder of the current lowest unique bid so as to generate the message body. Then at step 446, the messages are sent to the current bidder and the previous lowest unique bid holder.

Figure 12:
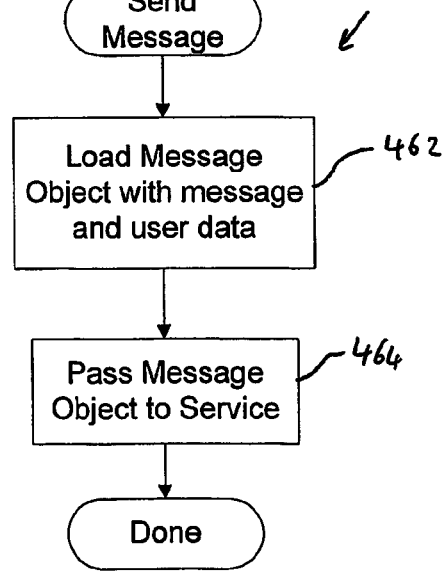
FIG. 12 shows a flow chart illustrating a message sending process used by the processes of FIGS. 9 and 10.

The process involved in sending a message, corresponding generally to steps 418, 426, 438 and 446 will now be described in greater detail with reference to FIG. 12. The message sending process 460 includes loading a message object with the message body and user data, including the mobile number, which identifies the destination for the message, the network operator associated with the mobile number, a queued status data item and an aggregator service identifier. The message object is then passed to the service server at step 464 for further processing as will be described in greater detail below. As will be appreciated, when two separate messages need to be sent, then two separate message objects are created and passed to the service server.

It will be appreciated that step 318 of high level flowchart 310 is carried out generally by various of the steps shown in flowchart 410.

After the bid data has been written to the user game bids table 280 at step 430, the bid processing, message marshalling and message despatch processes have completed. Then at step 320, the current session with the user can be terminated and the session database updated accordingly. Also the objects created during the bid processing can be destroyed. The overall procedure for processing bids for the auction is then completed. However, the auction application remains available to process bids up until the end of the auction or if the auction is made inactive for any reason.

Figure 13:
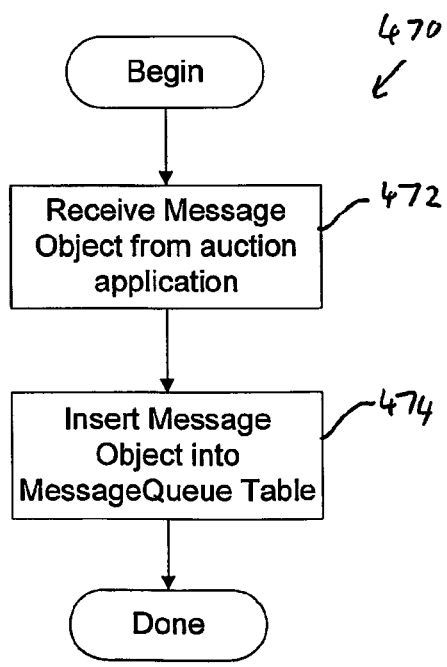
FIG. 13 shows a flow chart illustrating a message thread addition process used by the service application.
Figure 14:
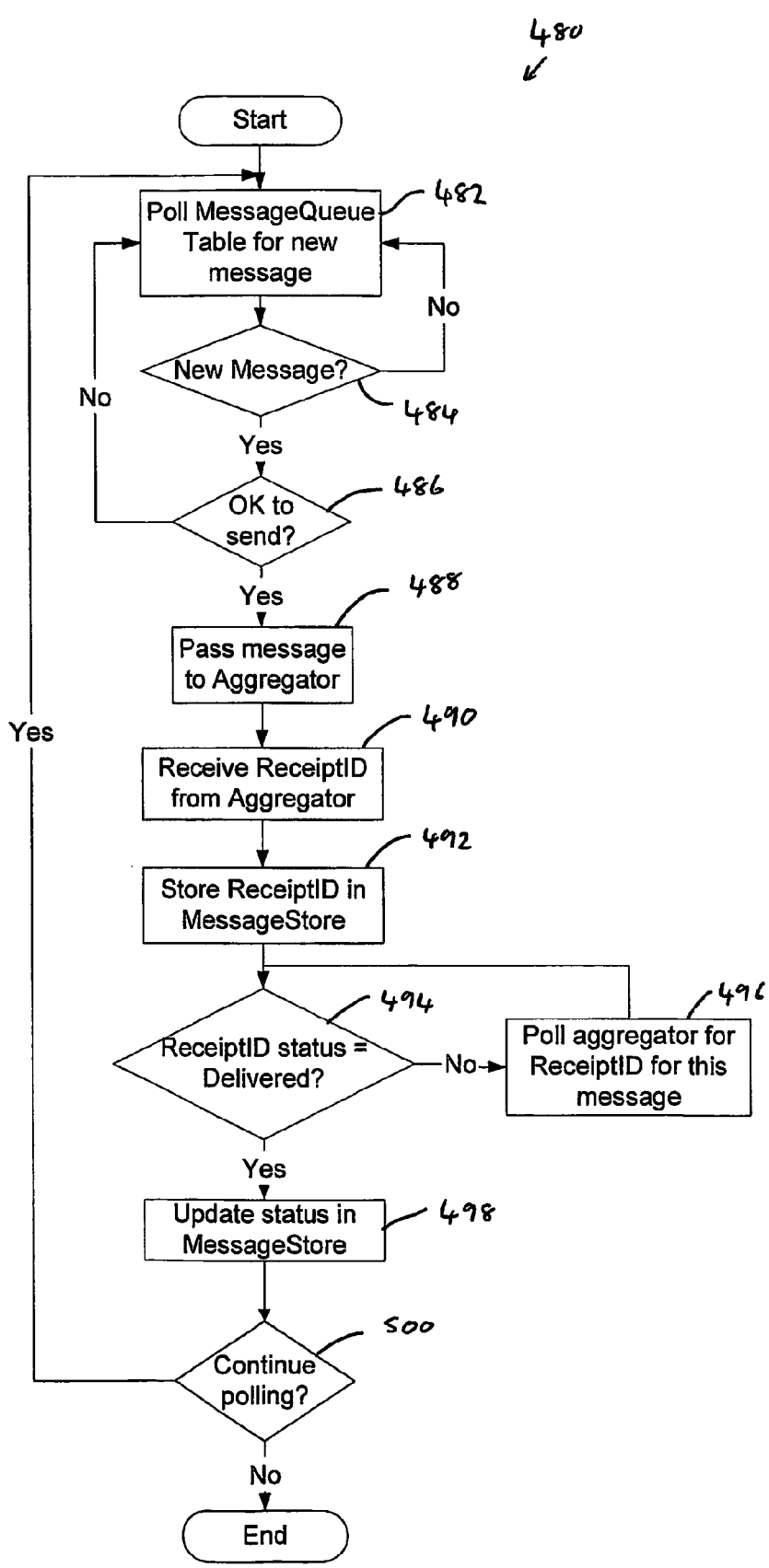
FIG. 14 shows a flow chart illustrating a message thread sending process used by the service application.

As illustrated by the process flowchart 470 shown in FIG. 13, the service server 192 receives the message objects from the auction application at step 472. Then the service server posts the messages into the message queue table 202 where they await despatch. The actual transmission of the messages as SMS messages is handled in part by a further thread of the service server 192 as will be described below with reference to process flowchart 480 in FIG. 14. At step 482 the service server 192 polls the message queue table to identify newly queued messages awaiting despatch. If it is determined at step 484 that there are no new messages, then process flow returns to 482 at which the message queue table is periodically polled. If it is determined at step 484 that there is a new message to be sent, then at step 486 it is determined whether it is OK to send the message. Messages are stored in the message queue table so that it is possible to schedule messages only to be delivered at a specific time. Messages can therefore be temporarily be stored in the message queue table before being picked up and sent out by the SMS gateway. If it is determined that it is not OK to send the message then process flow returns to step 482.

Otherwise, process flow proceeds to step 488 at which the message and data required by the aggregator that will transmit the message is passed by the service server via the web server to the aggregator server 132. The aggregator server 132 then generates a receipt ID data item to confirm receipt of the message. The aggregator server processes the message received from the auction system and converts it into the appropriate format for passing to the telecommunications network for transmission as an SMS message to the bidder.

At step 490, the receipt ID data item is received by the service server from the aggregator and at step 492 the receipt ID data item is stored in the message store table 210. The status data item in the message store table is set at "S" to indicate that the message has been sent.

At step 494, the service server periodically checks the status for each of the messages to determine whether the status has yet been updated to "R" to indicate that the SMS message has actually been received by the user. If, for a message, it is determined that the status has not been set at "R", then at step 496 the service server polls the aggregator using the receipt ID for the message and requesting that the aggregator update the current status of the message. The aggregator server can determine when a message has been successfully received by the end user. A reverse billed SMS mechanism is used in which the person receiving the bid acceptance SMS message is billed a charge associated with that bid acceptance message. It may be that the user does not have sufficient credit associated with their mobile phone in order to pay the charges associated with receiving the SMS message. In that case, the SMS message will not be delivered and the status of that message will remain as sent but not received.

However, once the SMS message has been received by the user, which causes the charge to be levied against the user, then at that time the aggregator server receives an indication that the message has been received and when next polled by the service server can notify the service server that the message has been received. Hence at step 498, the status data item for the message in the message store having the appropriate receipt ID is updated to "R" to indicate that the message has been successfully delivered. At step 500, the service server can determine whether to continue polling and does so, unless the application is terminated for other reasons.

Hence, the above provides a mechanism by which all bidders who successfully place a bid, whether that bid is successful or not, are charged for participating in the auction by having a bid acceptance message transmitted to them. Further, bid status notification messages are transmitted to bidders who have previously placed bids so as to notify them of the current status of their bid so that they can re-engage in the auction process.

Figure 15:
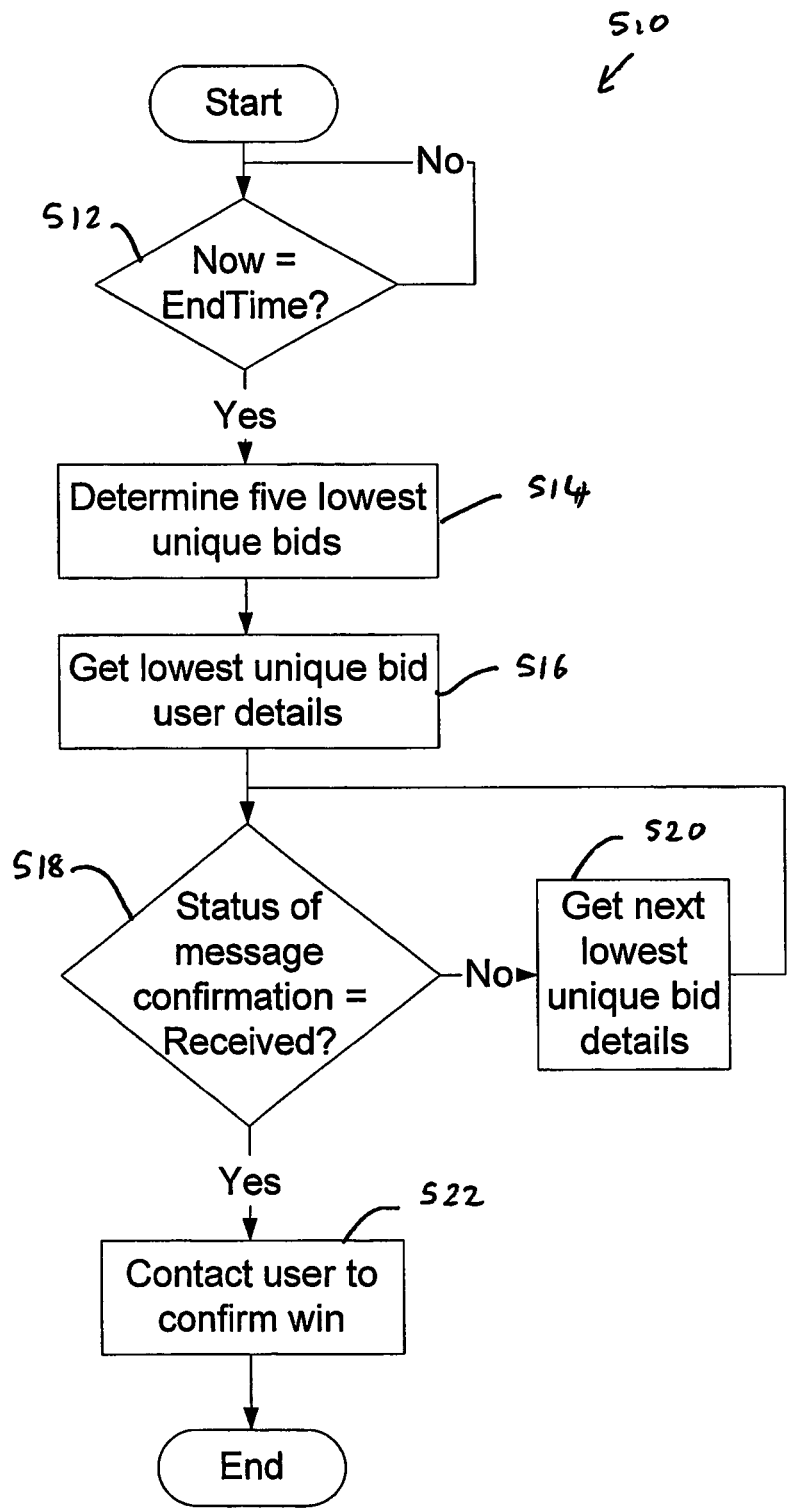
FIG. 15 shows a flow chart illustrating a winner notification process used by an administration application.

With reference to FIG. 15, there is shown a process flowchart 510 for identifying an auction winner as carried out by the administration application 196. At step 512, the administration application determines whether the current time corresponds to the end time of the auction. If not, the application waits until the current time corresponds to the end time of the auction. When the auction has closed, at step 514, the administration application carries out a database query to identify a group of lowest unique bids, e.g. five. Then at step 516, the user details for the lowest of the group of lowest unique bids are obtained from the database.

At step 518, it is determined whether the bid acceptance message corresponding to the lowest of the group of lowest unique bids was received by the user. If it was, then this indicates that the charge associated with placing that bid has been paid by the user. In practice, this involves checking that the status data item in the message store equals "R" for the bid acceptance message sent for the lowest unique bid. If it is determined at step 518 that the status is not received for that message, then process flow proceeds to step 520. At step 520, the user details for the next lowest of the group of lowest unique bids are obtained and the status of the bid acceptance message for that bid is also checked at step 518. This process continues until the lowest unique bid for which the bid acceptance message status equals received is identified.

Then at step 522, a message is generated and sent to the user so as to contact the user and notify them that they have won the auction. Then, as indicated by step 116 of FIG. 1A, arrangements are put in place for the bidder to buy the lot at their lowest unique bid price.

Figure 16:
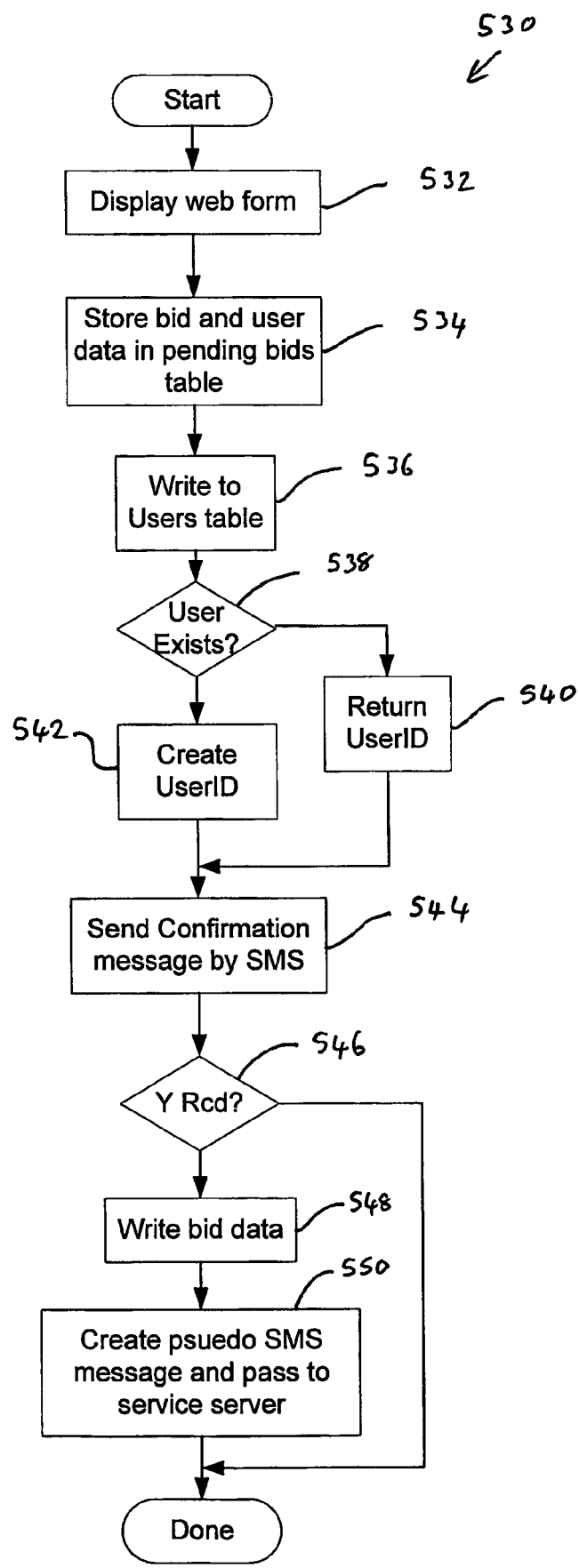
FIG. 16 shows a flow chart illustrating a web based bidding process.

With reference to FIG. 16, there is shown a flow chart illustrating a web based bidding process 530 in which a bidder places a bid via a web browser rather than via an SMS message. The bidding process 530 is carried out by the web server in co-operation with the application server. At step 532, in response to a http request from the bidder the web server generates and returns a web page including a web form having fields into which the bidder enters a number of data items, including their bid, in pence, their mobile phone number, the mobile phone operator, their name and their email address.

The received data items are stored in the pending bids table 290 at step 534. The bidder's details are written to the user table 204 at step 536 and it is determined at step 538, based on the users mobile phone number, whether a user account exists. If a user account exists then the user ID is returned at step 540, otherwise a user ID is created at step 542. At step 544, a standard confirmation message is sent to the aggregator for sending as an SMS message to the user's mobile phone number. At step 546 it is determined whether a positive reply to the confirmation message has been received by SMS from the user via the aggregator. If not then the process ends. If a positive response has been received, then at step 548 the bid data is written from the pending bid table to the UserGames and UserGameBids tables. Then at step 550 a pseudo SMS bid message is generated by the web server and passed to the service server, which treats the message as if it were originally an SMS message received from the aggregator as described above. The remainder of the processing is as described above with bid acceptance and bid status notification messages being sent to the bidder's mobile phone via SMS.

Figure 17:
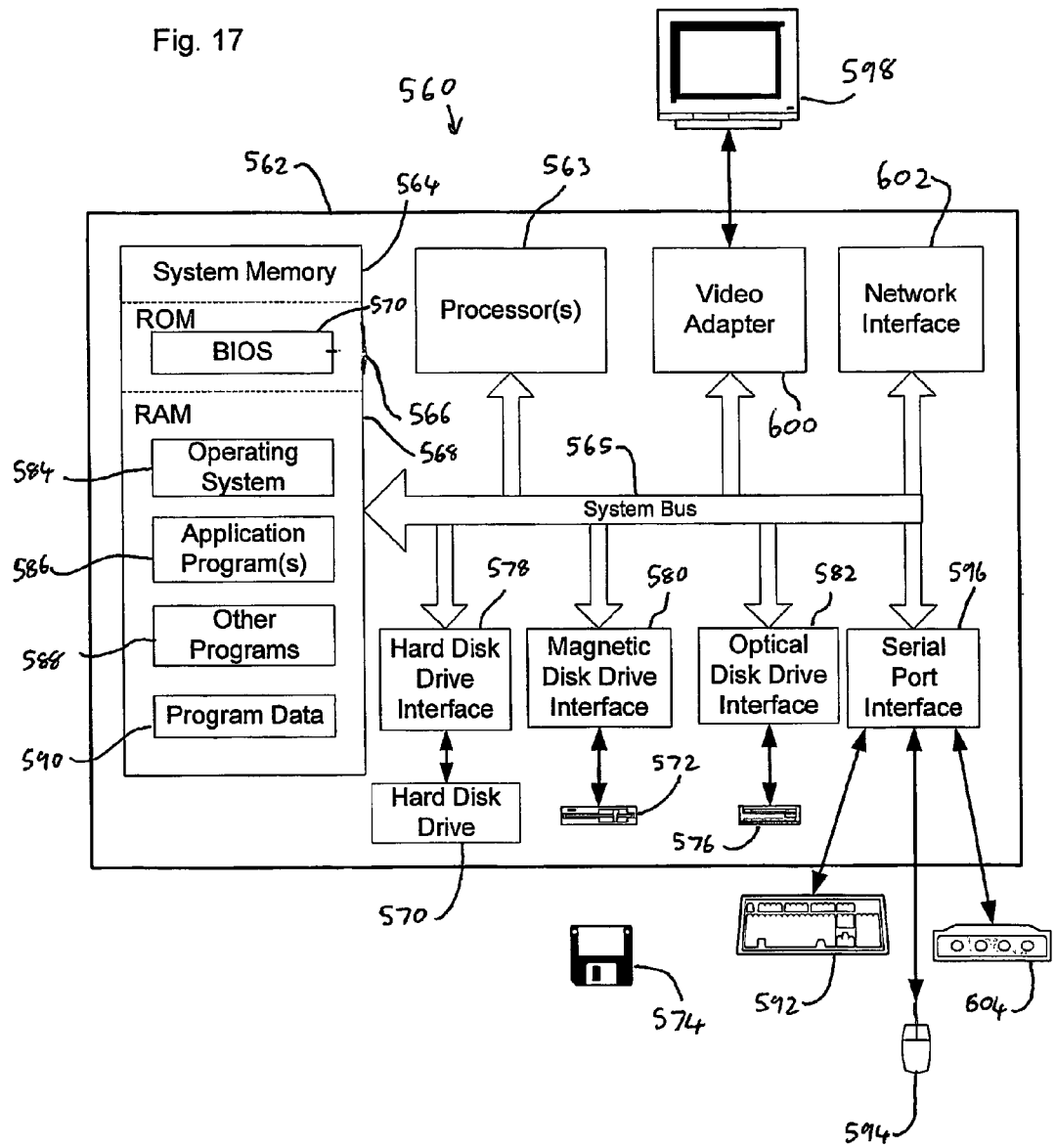
FIG. 17 shows a schematic block diagram of a data processing apparatus part of the invention.

FIG. 17 and the following discussion provide a brief, general description of an exemplary apparatus in which at least some aspects of the present invention may be implemented. Various methods of the present invention have been described in the general context of computer-executable code or instructions, e.g., program modules, being executed by a computer device such as the application server 144.

The methods of the present invention may be effected by other apparatus than the specific described computer devices. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 17, an exemplary apparatus 560 for implementing at least some aspects of the present invention includes a general purpose computing device, e.g., personal computer 562. The personal computer 562 may include a processing unit 563, a system memory 564, and a system bus 565 that couples various system components including the system memory 564 to the processing unit 563. The system bus 565 may be any of several types of bus structures including a memory bus or memory controller, a peripheral bus, and a local bus using any of a variety of bus architectures. The system memory 564 may include read only memory (ROM) 566 and/or random access memory (RAM) 568. A basic input/output system 570 (BIOS), including basic routines that help to transfer information between elements within the personal computer 572, such as during start-up, may be stored in ROM 566. The personal computer 562 may also include a hard disk drive 570 for reading from and writing to a hard disk, (not shown), a magnetic disk drive 572 for reading from or writing to a (e.g., removable) magnetic disk 574, and an optical disk drive 576 for reading from or writing to a removable (magneto) optical disk such as a compact disk or other (magneto) optical media. The hard disk drive 570, magnetic disk drive 572, and (magneto) optical disk drive 576 may be coupled with the system bus 565 by a hard disk drive interface 578, a magnetic disk drive interface 580, and a (magneto) optical drive interface 582, respectively. The drives and their associated storage media provide nonvolatile storage of machine readable instructions, data structures, program modules and other data for the personal computer 562. Although the exemplary environment described herein employs a hard disk, a removable magnetic disk 574 and a removable optical disk, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk, magnetic disk 574, (magneto) optical disk, ROM 566 or RAM 568, such as an operating system 584, one or more application programs 586, other program modules 588, and/or program data 590 for example. A user may enter commands and information into the personal computer 562 through input devices, such as a keyboard 592 and pointing device 594 for example. Other input devices (not shown) such as a microphone, joystick, game pad, satellite dish, scanner, or the like may also be included. These and other input devices are often connected to the processing unit 563 through a serial port interface 596 coupled to the system bus 565. However, input devices may be connected by other interfaces, such as a parallel port, a game port or a universal serial bus (USB). A monitor 598 or other type of display device may also be connected to the system bus 565 via an interface, such as a video adapter 600 for example. In addition to the monitor 858, the computer 822 may include other peripheral output devices (not shown), such as speakers and printers for example.

The computer 562 may operate in a networked environment which defines logical connections to one or more remote computers. The remote computer may be another personal computer, a server, a router, a network PC, a peer device or other common network node, and may include many or all of the elements described above relative to the computer 562. The computer 562 can be connected to a remote computer by logical connections including a local area network (LAN), a wide area network (WAN), an intranet and the Internet.

When used in a LAN, the computer 562 may be connected to the LAN through a network interface adapter (or "NIC") 602. When used in a WAN, such as the Internet, the computer 562 may include a modem 604 or other means for establishing communications over a wide area network. The modem 604, which may be internal or external, may be connected to the system bus 565 via the serial port interface 596. In a networked environment, at least some of the program modules depicted relative to the computer 562 may be stored in the remote memory storage device. The network connections described are exemplary and other means of establishing a communications link between the computers may be used.

It will be appreciated that the flowcharts illustrating the operations carried out are schematic and that certain of the operations may be omitted or the sequence changed or merged into other operations while still meeting the general teaching of the invention herein. Therefore the flowcharts are not intended to limit the invention to the specific flow of processing and operations illustrated.

In view of the description of the invention included herein, numerous additional embodiments and variations on the discussed embodiments of the present invention will be apparent to one of ordinary skill in the art. It is to be understood that such embodiments do not depart from the present invention and are to be considered within the scope of the invention.

The invention claimed is:

1. An auctioning system for facilitating bidder participation in an auction for the purchase of a lot, comprising:
   at least one data processing device and a memory in communication with the at least one data processing device, the memory storing instructions which, when executed executable by the at least one data processing device, cause the at least one data processing device to:
   (a) receive a plurality of messages from a plurality of bidders for the lot, each message including a bid for the lot;
   (b) determine whether each of the plurality of messages comprises an acceptable bid;
   (c) for each acceptable bid received from one of the bidders
      (i) determine whether said bid is unique;
      (ii) if the at least one data processing device determines that said bid is not unique:
         (A) cause a first bid acceptance message to be sent by reverse billed SMS to a communication device of said bidder, said first bid acceptance message including a notification that said bid is not unique; and
      (iii) if the at least one data processing device determines that said bid is unique, determine whether said bid is a lowest unique bid;
      (iv) if the at least one data processing device determines that said bid is the lowest unique bid:
         (A) cause a second bid acceptance message to be sent by reverse billed SMS to the communication device of said bidder, said second bid acceptance message including a notification that said bid is the lowest unique bid; and
      (v) if the at least one data processing device determines that said bid is unique but not the lowest unique bid:

(A) cause a third bid acceptance message to be sent by reverse billed SMS to the communication device of said bidder, said third bid acceptance message including a notification that said bid is unique but not the lowest unique bid;
and
(d) at a close of the auction, determine which one of the bidders is associated with the lowest unique bid, wherein the lowest unique bid is a winning bid in the auction for the purchase of the lot, wherein at least one acceptable bid is not the winning bid.

2. The auctioning system of claim 1, wherein the plurality of messages are received via SMS messaging.

3. The auctioning system of claim 1, wherein the instructions, when executed by the at least one data processing device, cause the at least one data processing device to limit each bidder to a maximum number of bids per auction.

4. The auctioning system of claim 1, wherein the instructions, when executed by the at least one data processing device, cause the at least one data processing device to either:
(a) for each of the messages received from the bidders, pass said message at least partially over the internet before processing the bid; or
(b) for each bid acceptance message sent to a bidder, pass said bid acceptance message at least partially over the internet before sending said bid acceptance message by reverse billed SMS.

5. The auctioning system of claim 1, wherein the instructions, when executed by the at least one data processing device, cause the at least one data processing device to communicate with the bidders by software in real time.

6. The auctioning system of claim 1, wherein the instructions, when executed by the at least one data processing device, cause the at least one data processing device to:
determine that the auction for the lot has ended; and
cause an auction winner notification message to be sent by SMS to the communication device of the bidder whose bid is the lowest unique bid, said auction winner notification message including a notification that the bidder has placed the winning bid.

7. The auctioning system of claim 1, wherein the instructions, when executed by the at least one data processing device, cause the at least one data processing device to, for each acceptable bid received from one of the bidders, determine whether said bid is unique by comparing an amount of said bid to an amount of each acceptable bid received prior to said bid.

8. The auctioning system of claim 1, wherein the instructions, when executed by the at least one data processing device, cause the at least one data processing device to, for each acceptable bid received from one of the bidders, if the at least one data processing device determines that said bid is the lowest unique bid:
(a) determine whether said bid changes from being the lowest unique bid to being unique but not the lowest unique bid by comparing an amount of said bid to an amount of a subsequent acceptable bid received from one of the bidders; and
(b) if the at least one data processing device determines that the amount of said subsequent bid is lower than the amount of said first-received bid, cause a first status change notification message to be sent to the communication device of said bidder of said first-received bid by SMS, said first status change notification message including a notification that said first-received bid is no longer the lowest unique bid but is unique.

9. The auctioning system of claim 8, wherein if the at least one data processing device determines that the amount of said subsequent bid is lower than the amount of said first-received bid, said first-received bid cannot be the winning bid.

10. The auctioning system of claim 1, wherein the instructions, when executed by the at least one data processing device, cause the at least one data processing device to, for each acceptable bid received from one of the bidders, if the at least one data processing device determines that said bid is the lowest unique bid:
(a) determine whether said bid changes from being the lowest unique bid to not being unique by comparing an amount of said bid to an amount of a subsequent acceptable bid received from one of the bidders; and
(b) if the at least one data processing device determines that the amount of the subsequent bid is equal to the amount of said first-received bid, cause a second status change notification message to be sent to the communication device of said bidder of said first-received bid by SMS, said second status change notification message including a notification that said first-received bid is no longer unique.

11. The auctioning system of claim 10, wherein if the at least one data processing device determines that the amount of said subsequent is equal to the amount of said first-received bid, neither said first-received bid nor said subsequent bid can be the winning bid.

12. The auctioning system of claim 1, wherein the instructions, when executed by the at least one data processing device, cause the at least one data processing device to, for each acceptable bid received from one of the bidders, if the at least one data processing device determines that said bid is unique but not the lowest unique bid:
(i) determine whether said bid changes from being unique to not being unique by comparing an amount of said bid to an amount of a subsequent acceptable bid received from one of the bidders; and
(ii) if the at least one data processing device determines that the amount of said subsequent bid is equal to the amount of said first-received bid, cause a second status change notification to be sent to the communication device of said bidder of said first-received bid by SMS, said second status change notification message including a notification that said first-received bid is no longer unique.

13. The auctioning system of claim 12, wherein if the at least one data processing device determines that said first-received bid is unique but not the lowest unique bid, said first-received bid cannot be the winning bid.

14. An auctioning system for facilitating bidder participation in an auction for the purchase of a lot, comprising;
at least one data processing device and a memory in communication with the at least one data processing device, the memory storing instructions which, when executed by the at least one data processing device, cause the at least one data processing device to:
(a) receive a plurality of bid data items over a computer network to which a computer system is connected, each bid data item being derived from a bid message sent by one of a plurality of bidders;
(b) determine whether each bid data item comprises an acceptable bid;
(c) for each bid data item sent by one of the bidders that comprises an acceptable bid, for each acceptable bid:
(i) determine whether said bid is unique;
(ii) if the at least one data processing device determines that said bid is not unique:

(A) determine a phone number of a communication device of said bidder;

(B) using said determined phone number, cause a first bid acceptance message to be sent at least partially over the computer network by a reverse-billed SMS message to the communication device of said bidder, said first bid acceptance message including a notification that said bid is not unique; and (iii) if the at least one data processing device determines that said bid is unique, determine whether said bid is a lowest unique bid;

(iv) if the at least one data processing device determines that said bid is the lowest unique bid:

(A) using said determined phone number, cause a second bid acceptance message to be sent at least partially over the computer network by a reverse-billed SMS message to the communication device of said bidder, said second bid acceptance message including a notification that said bid is the lowest unique bid; and (v) if the at least one data processing device determines that said bid is unique but not the lowest unique bid:

(A) using said determined phone number, cause a third bid acceptance message to be sent at least partially over the computer network by a reverse-billed SMS message to the communication device of said bidder, said third bid acceptance message including a notification that said bid is unique but not the lowest unique bid; and (d) at a close of the auction, determine which one of the bidders is associated with the bid data item comprising the a-lowest unique bid, wherein the lowest unique bid is a winning bid in the auction for the purchase of the lot, wherein at least one acceptable bid is not the winning bid.

15. The auctioning system of claim 14, wherein the instructions, when executed by the at least one data processing device, cause the at least one data processing device to, for at least one of the bid messages sent by one of the bidders:

receive an auction identifier data item, the auction identifier data item being derived from said bid message; and use said auction identifier data item to determine an auction corresponding to the auction identifier data item.

16. The auctioning system of claim 14, wherein the instructions, when executed by the at least one data processing device, cause the at least one data processing device to, for at least one of the bid data items:

validate said bid data item to determine whether a corresponding bid is an acceptable bid for the auction.

17. The auctioning system of claim 16, wherein the instructions, when executed by the at least one data processing device, cause the at least one data processing device to validate each of the bid data items by at least one of the following:

determining whether the auction is active;

determining whether a bid corresponding to said bid data item exceeds a maximum number of bids for the bidder of said bid data item; and determining whether said bid data item falls within a range of acceptable bid values.

18. The auctioning system of claim 14, wherein the instructions, when executed by the at least one data processing device, cause the at least one data processing device to:

(a) poll a message store to identify new bid messages; and (b) for at least one of the new bid messages associated with a bid:

(i) use a mobile phone telephone number data item to determine whether said bid is associated with a live session for a first auction; and (ii) if said bid is associated with a live session for the first auction, load message data into a first message object;

(iii) if said bid is not associated with the live session for the first auction, use an auction identifier data item to determine whether said bid is for a second auction and, if said bid is associated with the second auction, load the message data into a second message object; and (iv) pass the message object to an auction application.

19. The auctioning system of claim 14, wherein the instructions, when executed by the at least one data processing device, cause the at least one data processing device to, for each of the bid data items:

determine whether said bid data item is in the correct bid units; and if said bid data item is not in the correct bid units, convert said bid data item into the correct bid units.

20. The auctioning system of claim 14, wherein the instructions, when executed by the at least one data processing device, cause the at least one data processing device to generate a unique identifier for each received bid data item.

21. The auctioning system of claim 14, wherein the instructions, when executed by the at least one data processing device, cause the at least one data processing device to, for each bid data item sent by one of the bidders that comprises an acceptable bid, for each acceptable unique bid, determine whether said bid is the lowest unique bid by:

(a) looking up a database of stored bid data items for the auction;

(b) determining whether the number of stored bids at a bid data item value is zero;

(c) if the number of stored bids at the bid data item value is zero, looking up the database of stored bid data items for the auction to determine a lowest unique bid value; and (d) determining whether a bid data item value is less than the lowest unique bid value.

22. The auctioning system of claim 14, wherein the instructions, when executed by the at least one data processing device, cause the at least one data processing device to, for each of the bid acceptance messages, marshal said bid acceptance message by:

(a) selecting a message template for said bid acceptance message;

(b) looking up stored variable data items; and (c) populating said selected message template with said variable data items.

23. The auctioning system of claim 14, wherein the instructions, when executed by the at least one data processing device, cause the at least one data processing device to, for each of the bid acceptance messages, send said bid acceptance message by loading a message object with message data and bidder data.

24. The auctioning system of claim 23, wherein the instructions, when executed by the at least one data processing device, cause the at least one data processing device to, for each of the bid acceptance messages, send said bid acceptance message by placing the message object in a message queue table.

25. The auctioning system of claim 24, wherein the instructions, when executed by the at least one data processing device, cause the at least one data processing device to, for each of the bid acceptance messages, sending send said bid the-acceptance message further by:

(a) polling the message queue table to identify new bid messages; and
(b) passing any new bid messages to an aggregator service for transmission as a reverse billed SMS message to the bidders of said new bids.

26. The auctioning system of claim 25, wherein the instructions, when executed by the at least one data processing device, cause the at least one data processing device to receive a receipt ID from the aggregator for the message passed to the aggregator and store the receipt ID when received.

27. The auctioning system of claim 26, wherein the instructions, when executed by the at least one data processing device, cause the at least one data processing device to determine whether the receipt ID has been received and update a status associated with the sent message.

28. The auctioning system of claim 27, wherein the instructions, when executed by the at least one data processing device, cause the at least one data processing device to:
(a) identify a group of lowest unique bids; and
(b) determine the lowest bid of the group of lowest unique bids for which the bid acceptance message has been received.

29. The auctioning system of claim 14, wherein the instructions, when executed by the at least one data processing device, cause the at least one data processing device to:
determine that the auction for the lot has ended; and
cause an auction winner notification message to be sent by SMS to the communication device of the bidder whose bid is the lowest unique bid, said auction winner notification message including a notification that the bidder has placed the winning bid.

30. An auctioning system for facilitating bidder participation in an auction for the purchase of a lot, comprising:
at least one data processing device and a memory in communication with the at least one data processing device, the memory storing instructions which, when executed by the at least one data processing device, cause the at least one data processing device to:
(a) receive a plurality of messages from a plurality of bidders for the lot, each message including a bid for the lot;
(b) determine whether each of the plurality of messages comprises an acceptable bid;
(c) for each acceptable bid received from one of the bidders:
  (i) determine whether said bid is unique;
  (ii) if the at least one data processing device determines that said bid is not unique:
    (A) cause a first bid acceptance message to be sent by reverse billed SMS to a communication device of said bidder, said first bid acceptance message including a notification that said bid is not unique; and
  (iii) if the at least one data processing device determines that said bid is unique, determine whether said bid is a lowest unique bid;
  (iv) if the at least one data processing device determines that said bid is the lowest unique bid:
    (A) cause a second bid acceptance message to be sent by reverse billed SMS to the communication device of said bidder, said second bid acceptance message including a notification that said bid is the lowest unique bid;
    (B) determine whether said bid changes from being the lowest unique bid to being unique but not the lowest unique bid by comparing an amount of said bid to an amount of a subsequent acceptable bid received from one of the bidders and, if the at least one data processing device determines that said first-received bid changes from being the lowest unique bid to being unique but not the lowest unique bid, cause a first status change notification message to be sent by SMS to the communication device of said bidder of said first-received bid, said first status change notification message including a notification that said first-received bid is no longer the lowest unique bid but is unique; and
    (C) determine whether said bid changes from being the lowest unique bid to not being unique by comparing the amount of said bid to an amount of a subsequent acceptable bid received from one of the bidders and, if the at least one data processing device determines that said first-received bid changes from being the lowest unique bid to not being unique, cause a second status change notification message to be sent by SMS to the communication device of said bidder of said first-received bid, the second status change notification message including a notification that said first-received bid is no longer unique; and
  (v) if the at least one data processing device determines that said bid is unique but not the lowest unique bid:
    (A) cause a third bid acceptance message to be sent by reverse billed SMS to the communication device of said bidder, said third bid acceptance message including a notification that said bid is unique but not the lowest unique bid; and
    (B) determine whether said bid changes from being unique to not being unique by comparing the amount of said bid to an amount of a subsequent acceptable bid received from one of the bidders and, if the at least one data processing device determines that said first-received bid changes from being unique to not being unique, cause the second status change notification message to be sent by SMS to the communication device of said bidder of said first-received bid, said second status change notification message including a notification that said first-received bid is no longer unique; and
(d) at a close of the auction, determine which one of the bidders is associated with the lowest unique bid, wherein the lowest unique bid is a winning bid in the auction for the purchase of the lot, wherein at least one acceptable bid is not the winning bid.

* * * * *